US012695485B2

(12) United States Patent (10) Patent No.: US 12,695,485 B2
Yang et al. (45) Date of Patent: Jul. 28, 2026

(54) CONSTELLATION SHAPING FOR MULTIPLE USER MULTIPLE INPUT MULTIPLE OUTPUT

(71) Applicant: QUALCOMM Incorporated, San Diego, CA (US)

(72) Inventors: Wei Yang, San Diego, CA (US); Jing Jiang, San Diego, CA (US); Jae Won Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/448,128

(22) Filed: Aug. 10, 2023

(65) Prior Publication Data

US 2025/0055510 A1 Feb. 13, 2025

(51) Int. Cl.
*H04B 7/0452* (2017.01)
*H04L 1/00* (2006.01)

(52) U.S. Cl.
CPC ......... *H04B 7/0452* (2013.01); *H04L 1/0003* (2013.01)

(58) Field of Classification Search
CPC ... H04B 7/0452; H04L 1/0003; H04L 1/0009; H04L 1/0016; H04L 25/03242; H04L 25/03866
See application file for complete search history.

(56) References Cited

U.S. PATENT DOCUMENTS

| | | | | |
|---|---|---|---|---|
| 2010/0034318 A1* | 2/2010 | Lui | ..................... | H04L 27/2003 |
| | | | | 375/324 |
| 2010/0157924 A1* | 6/2010 | Prasad | .............. | H04W 72/0446 |
| | | | | 370/329 |
| 2016/0323858 A1* | 11/2016 | Seo | ........................ | H04L 5/0048 |
| 2021/0211229 A1* | 7/2021 | Doan | ................... | H04L 27/3405 |
| 2021/0367654 A1 | 11/2021 | Goutay et al. | | |

FOREIGN PATENT DOCUMENTS

| | | | | | |
|---|---|---|---|---|---|
| CN | 107124771 A | * | 9/2017 | ............ | H04W 72/23 |
| WO | 2022183472 A1 | | 9/2022 | | |
| WO | 2022222094 A1 | | 10/2022 | | |
| WO | 2023216177 A1 | | 11/2023 | | |

OTHER PUBLICATIONS

International Search Report and Written Opinion—PCT/US2024/037143—ISA/EPO—Oct. 29, 2024.

* cited by examiner

*Primary Examiner* — Zhensheng Zhang
(74) *Attorney, Agent, or Firm* — Procopio, Cory, Hargreaves & Savitch LLP/Qualcomm

(57) ABSTRACT

The apparatus may be a wireless device such as a UE configured to receive an indication of at least one shaping operation associated with one or more additional wireless devices in a plurality of wireless devices, where each of the plurality of wireless devices is associated with MU-MIMO communication, and where the first wireless device is included in the plurality of wireless devices. The apparatus may be configured to receive a DL transmission associated with the MU-MIMO communication, perform a demodulation of the DL transmission based on the indication, and output a result of the demodulation of the DL transmission for at least one of a transmission to at least one other wireless device or a local storage at the first wireless device.

30 Claims, 11 Drawing Sheets

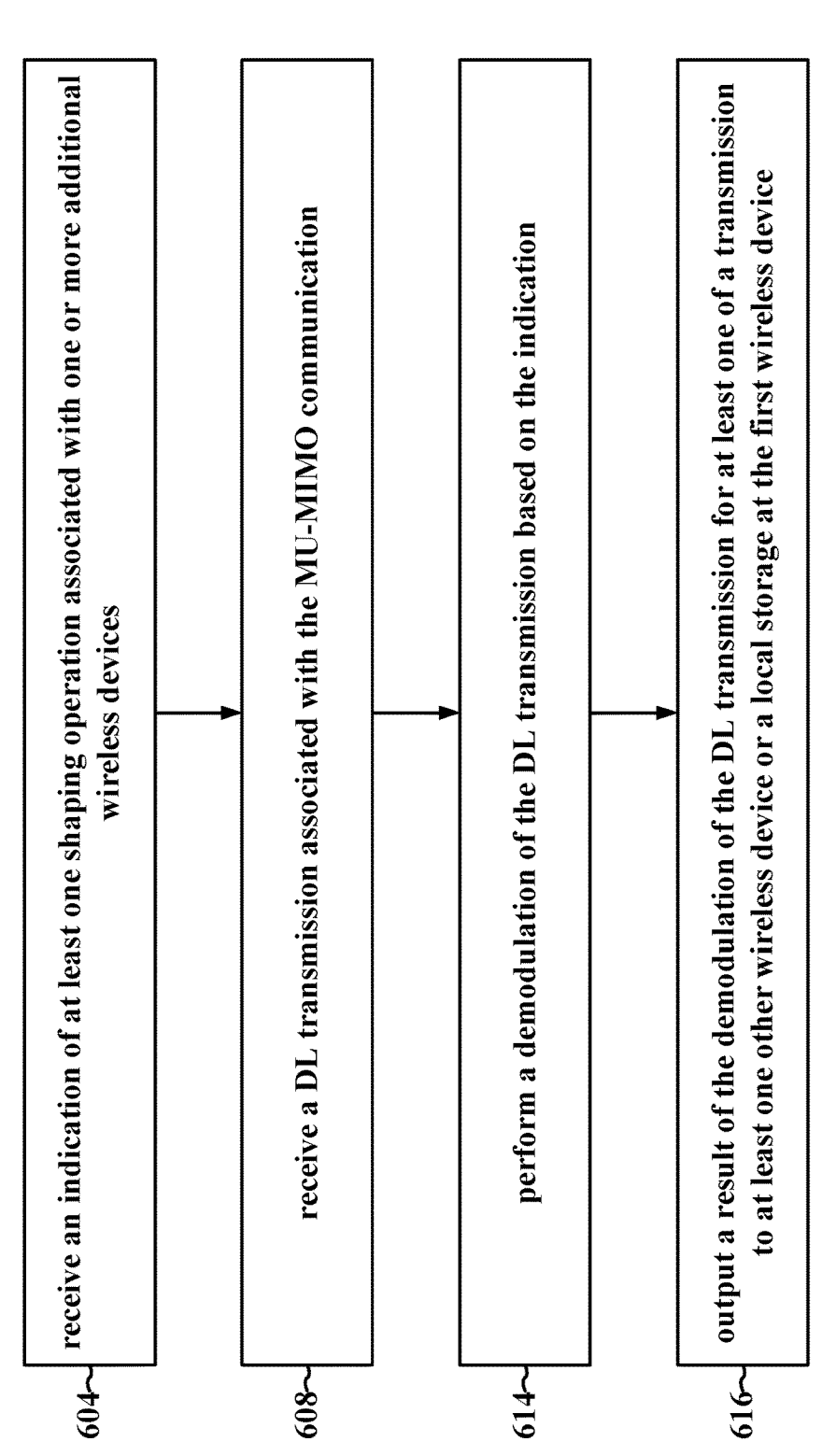

604 — receive an indication of at least one shaping operation associated with one or more additional wireless devices 608 — receive a DL transmission associated with the MU-MIMO communication 614 — perform a demodulation of the DL transmission based on the indication 616 — output a result of the demodulation of the DL transmission for at least one of a transmission to at least one other wireless device or a local storage at the first wireless device

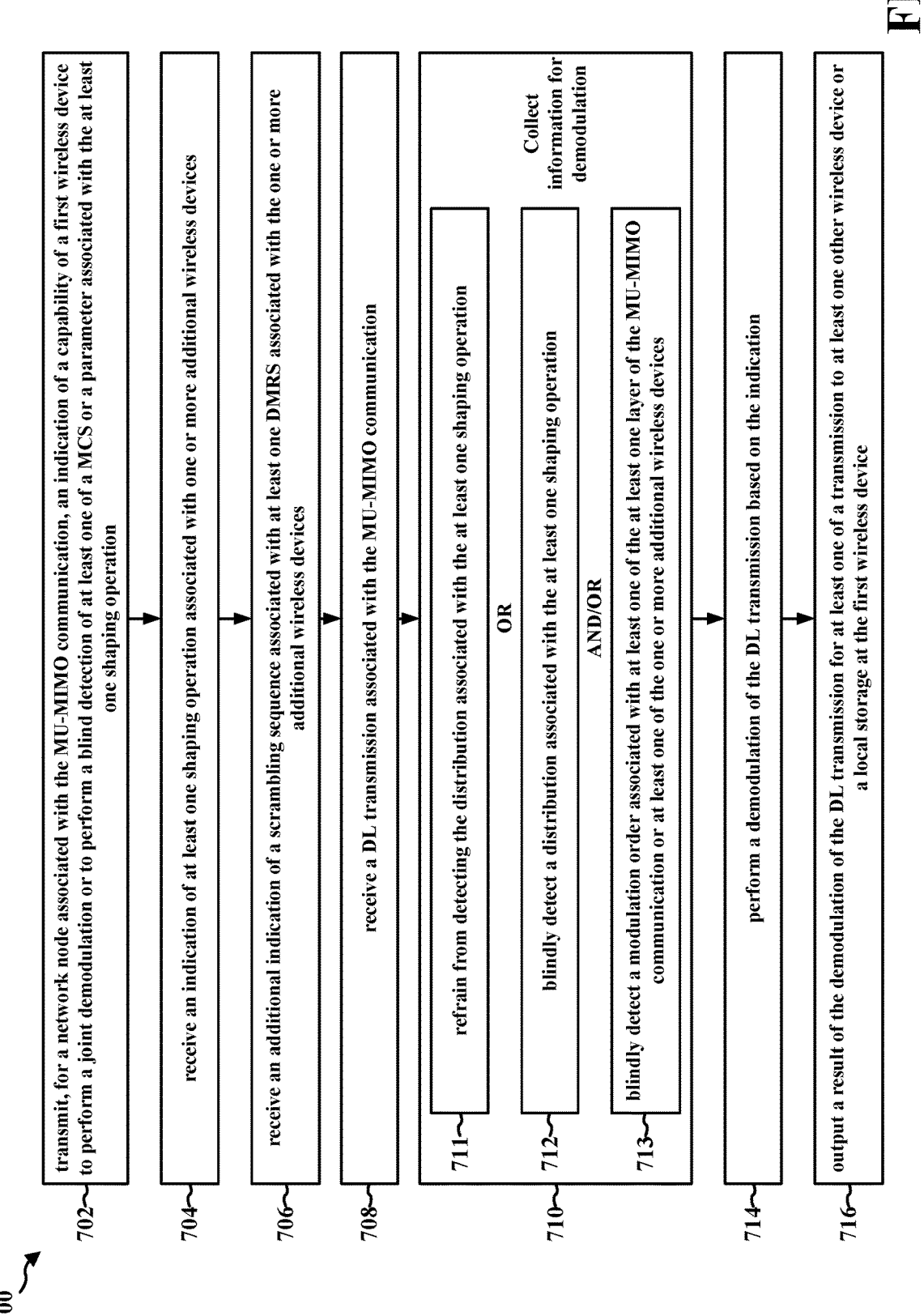

702 — transmit, for a network node associated with the MU-MIMO communication, an indication of a capability of a first wireless device to perform a joint demodulation or to perform a blind detection of at least one of a MCS or a parameter associated with the at least one shaping operation 704 — receive an indication of at least one shaping operation associated with one or more additional wireless devices 706 — receive an additional indication of a scrambling sequence associated with at least one DMRS associated with the one or more additional wireless devices 708 — receive a DL transmission associated with the MU-MIMO communication 711 — refrain from detecting the distribution associated with the at least one shaping operation

OR

712 — blindly detect a distribution associated with the at least one shaping operation Collect information for demodulation

AND/OR

713 — blindly detect a modulation order associated with at least one of the at least one layer of the MU-MIMO communication or at least one of the one or more additional wireless devices 714 — perform a demodulation of the DL transmission based on the indication 716 — output a result of the demodulation of the DL transmission for at least one of a transmission to at least one other wireless device or a local storage at the first wireless device

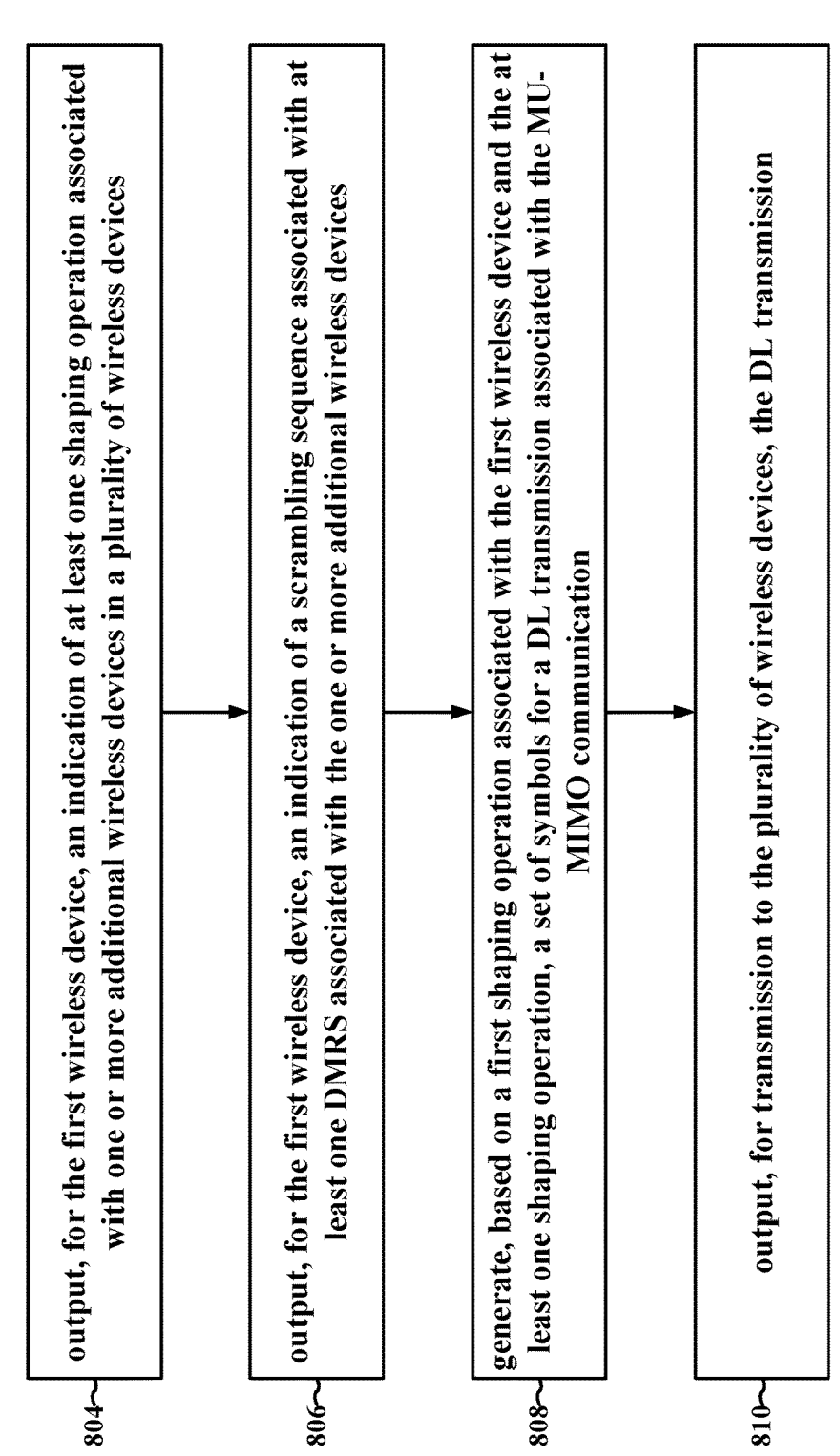

FIG. 8

804 — output, for the first wireless device, an indication of at least one shaping operation associated with one or more additional wireless devices in a plurality of wireless devices 806 — output, for the first wireless device, an indication of a scrambling sequence associated with at least one DMRS associated with the one or more additional wireless devices 808 — generate, based on a first shaping operation associated with the first wireless device and the at least one shaping operation, a set of symbols for a DL transmission associated with the MU-MIMO communication 810 — output, for transmission to the plurality of wireless devices, the DL transmission

800

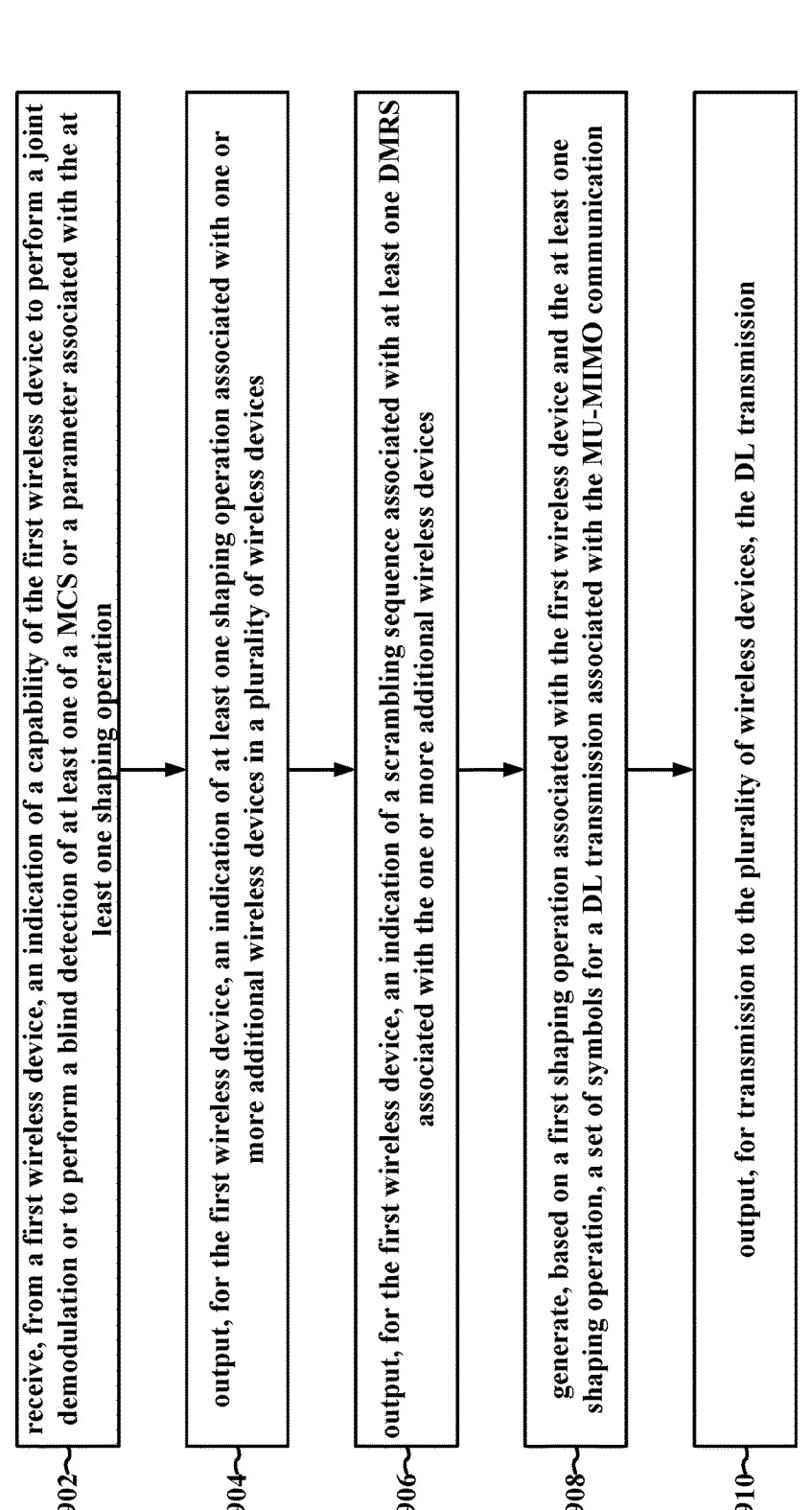

902 — receive, from a first wireless device, an indication of a capability of the first wireless device to perform a joint demodulation or to perform a blind detection of at least one of a MCS or a parameter associated with the at least one shaping operation 904 — output, for the first wireless device, an indication of at least one shaping operation associated with one or more additional wireless devices in a plurality of wireless devices 906 — output, for the first wireless device, an indication of a scrambling sequence associated with at least one DMRS associated with the one or more additional wireless devices 908 — generate, based on a first shaping operation associated with the first wireless device and the at least one shaping operation, a set of symbols for a DL transmission associated with the MU-MIMO communication 910 — output, for transmission to the plurality of wireless devices, the DL transmission

CONSTELLATION SHAPING FOR MULTIPLE USER MULTIPLE INPUT MULTIPLE OUTPUT

TECHNICAL FIELD

The present disclosure relates generally to communication systems, and more particularly, to constellation shaping operations used in association with multiple user (MU) multiple input multiple output (MIMO) (MU-MIMO) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device such as a user equipment (UE) configured to receive an indication of at least one shaping operation associated with one or more additional wireless devices in a plurality of wireless devices, where each of the plurality of wireless devices is associated with MU-MIMO communication, and where the first wireless device is included in the plurality of wireless devices. The apparatus may be configured to receive a downlink (DL) transmission associated with the MU-MIMO communication, perform a demodulation of the DL transmission based on the indication, and output a result of the demodulation of the DL transmission for at least one of a transmission to at least one other wireless device or a local storage at the first wireless device.

In an aspect of the disclosure, a method, a computer-readable medium, and an apparatus are provided. The apparatus may be a network node such as a base station configured to output, for a first wireless device, an indication of at least one shaping operation associated with one or more additional wireless devices in a plurality of wireless devices, where each of the plurality of wireless devices is associated with MU-MIMO communication, and where the first wireless device is included in the plurality of wireless devices. The apparatus may be configured to generate, based on a first shaping operation associated with the first wireless device and the at least one shaping operation, a set of symbols for a DL transmission associated with the MU-MIMO communication and output, for transmission to the plurality of wireless devices, the DL transmission.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 is a flowchart of a method of wireless communication.

FIG. 7 is a flowchart of a method of wireless communication.

FIG. 8 is a flowchart of a method of wireless communication.

FIG. 9 is a flowchart of a method of wireless communication.

DETAILED DESCRIPTION

Figure 1:
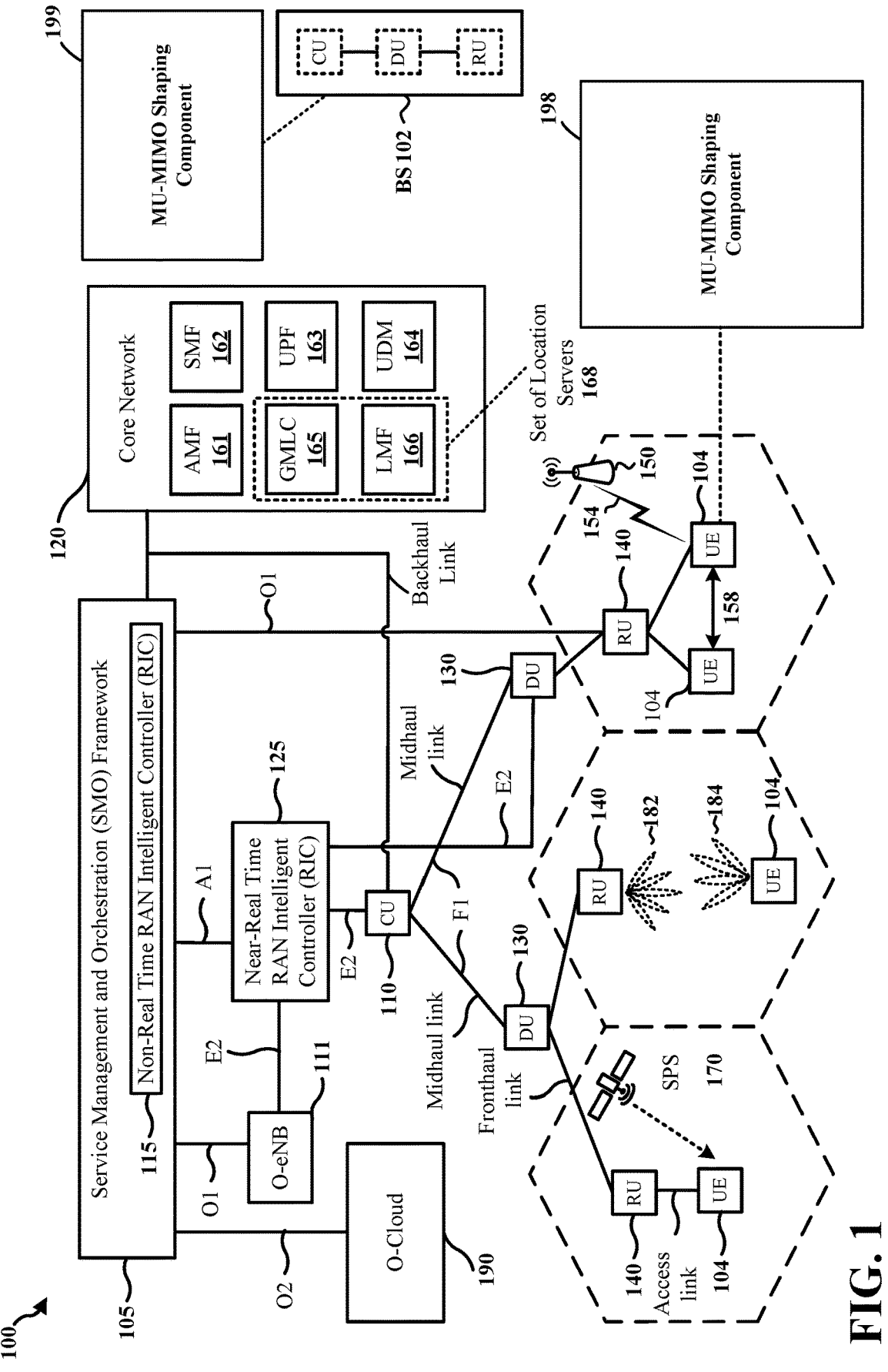
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Various aspects relate generally to the use of bit shaping (e.g., a probabilistic shaping (PS), geometric shaping (GS), and/or distribution matching (DM)) in association with MU-MIMO communication. Probabilistic shaping (e.g., as an example of bit shaping), in some aspects, may be used to generate non-uniformly distributed quadrature amplitude modulation (QAM) constellations to maximize an achievable information rate (AIR) (e.g., associated with mutual information such as I(X;Y) of the channel input "X" and an output "Y").

In some aspects, a PS used to improve an AIR may be a probabilistic amplitude shaping (PAS), where the distribution of the amplitude of the modulation constellation is shaped, and the sign of the constellation is kept uniform. In some aspects of PAS, a shaping may be applied prior to coding, and may use a systematic FEC to preserve the shaping on the information bits, and map the parity bits to the sign of the constellation. In some aspects, a PAS may provide a benefit for single input single output (SISO) and may provide similar or greater benefit for MIMO. For example, for MIMO associated with a PAS, one or more interference (or interfering) layers may be shaped, where the shaping may be exploited by a non-linear demodulator (e.g., sphere decoding) to better estimate the interference symbols.

For single-user MIMO (SU-MIMO), the receiver (e.g., a UE) may know the shaping information about the interfering and/or interference layer (e.g., where the shaping information for the interference layers may be the same as the signal layer). However, for MU-MIMO, a first receiver (e.g., a first UE) in a plurality of receivers associated with the MU-MIMO may have difficulties obtaining information about the interference layers associated with the other receivers in the plurality of receivers. In some aspects of wireless communication, a related standard may provide limited restrictions and/or side-information related to MU-MIMO scheduling. For example, there may be no explicit information related to the presence of co-scheduled UEs, and no guarantee for matching allocations (e.g., a modulation and coding scheme (MCS) and/or PAS parameters) across co-scheduled UEs. In some aspects, a standard (or specification) may specify common DMRS locations for one or more co-scheduled UEs, a base station may use orthogonal DMRS ports across co-scheduled UEs, and the base station may use the same scrambling sequence across the orthogonal DMRS ports. In some aspects, a PDSCH RB allocation may be physical resource group (PRG) aligned across co-scheduled UEs. In some aspects, a UE may detect whether there are co-scheduled UEs. Then, letting a base station indicate the presence of a co-scheduled UE may be one approach to let the UE make this detection. As such, the co-scheduling of UEs may be associated with MU interference presence determination at a base station or UE.

In some aspects, e.g., related to 5G (up to Rel-17), for UEs with advanced MU receivers for a MU-MIMO, a UE may blindly detect the presence of MU interference (e.g., associated with co-scheduled users or UEs) and/or a modulation order (e.g., an MCS) associated with the MU interference. The blind detection, in some aspects, may be used to perform joint demodulation across the signals for the UE and the MU interferences. If the MU-MIMO further is associated with a constellation shaping operation (e.g., one of the PS, PAS, GS, or other shaping operation), the joint demodulation may be further complicated by the shaping operation. For example, the UE may detect the presence of the MU interference, the modulation order, and the shaping operation. In some instances, "joint demodulating" across signal A (intended for this user) and B (intended for another user) here means that the receiver for A will try to exploit the modulation structures of B when demodulating A. Mathematically, a MIMO signal can be written as: $Y=A+B+noise$. A conventional demodulator may demodulate A, by treating B as (Gaussian) noise. Also, a joint demodulator may demodulate A by exploiting the fact that the signal B comes from a finite constellation, that is different from the noise structure. For example, a joint demodulator may find the best estimate of B (B'), and then subtract this B' from Y, and demodulate A from y-B'. Another form of joint demodulator may run over all possible combinations of A and B, and select the best among combinations. For example, suppose A and B are each modulated from four different possible constellation points (e.g., QPSK). Then, a joint demodulator may try to demodulate A+B by enumerating all 4×4=16 possible combinations of A and B. Some form of joint demodulation algorithms may include: maximum-likelihood (ML), sphere detection, lattice detection, successive cancellation, message passing, expectation propagation detection, etc. In some aspects, network-assisted signaling may be used to reduce MU detection complexity associated with a MU-MIMO incorporating a shaping operation.

Some aspects more specifically relate to signaling to support MU-MIMO incorporating a shaping operation. In some examples, a first wireless device may transmit, and a network node may receive, a first capability indication that the first wireless device is capable of performing a joint demodulation based on an indication of at least one shaping operation or a second capability indication of whether the first wireless device is capable of performing a blind detection of at least one of an MCS or a parameter associated with the at least one shaping operation. Based on one or more of the first capability indication or the second capability indication, the network node may transmit, and the wireless device may receive, an indication of at least one shaping operation associated with one or more additional wireless devices in a plurality of wireless devices. In some aspects, each of the plurality of wireless devices is associated with MU-MIMO communication and the first wireless device is included in the plurality of wireless devices. The network node, in some aspects, may generate, based on a first shaping operation associated with the first wireless device and the at least one shaping operation, a set of symbols for a transmission (e.g., a DL transmission, a PDSCH transmission, a PDCCH transmission, etc.) associated with the MU-MIMO communication. In some aspects, the network node may output, for transmission to the plurality of wireless devices, the (generated) DL transmission and the first wireless device may receive the DL transmission associated with the MU-MIMO communication, perform a demodulation of the DL transmission based on the indication (e.g., the indicated at least one shaping operation), and may output a result of the demodulation of the DL transmission for at least one of a transmission to at least one other wireless device (or network nodes) or a local storage at the first wireless device. For instance, the indication of at least one shaping operation may refer to the shaping operation applied to the co-scheduled UEs.

Particular aspects of the subject matter described in this disclosure can be implemented to realize one or more of the following potential advantages. In some examples, by providing signaling of a shaping operation associated with an MU-MIMO, the described techniques can be used to provide significant performance benefit (e.g., a >2 dB shaping gain relative to uniform QAM, blind MU modulation order detection, and/or advanced MIMO receiver), and/or complexity saving (relative to blind MU PAS information detection), at the expense of very minor signaling overhead (e.g., one, to a few, bits per DL transmission) from a network node (e.g., a base station) to the wireless device.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a MU-MIMO shaping component 198 that may be configured to receive an indication of at least one shaping operation associated with one or more additional wireless devices in a plurality of wireless devices, where each of the plurality of wireless devices is associated with MU-MIMO communication, and where the first wireless device is included in the plurality of wireless devices. The MU-MIMO shaping component 198 may be configured to receive a DL transmission associated with the MU-MIMO communication, perform a demodulation of the DL transmission based on the indication, and output a result of the demodulation of the DL transmission for at least one of a transmission to at least one other wireless device or a local storage at the first wireless device. In certain aspects, the base station 102 may have a MU-MIMO shaping component 199 that may be configured to output, for a first wireless device, an indication of at least one shaping operation associated with one or more additional wireless devices in a plurality of wireless devices, where each of the plurality of wireless devices is associated with MU-MIMO communication, and where the first wireless device is included in the plurality of wireless devices. The MU-MIMO shaping component 199 may be configured to generate, based on a first shaping operation associated with the first wireless device and the at least one shaping operation, a set of symbols for a DL transmission associated with the MU-MIMO communication and output, for transmission to the plurality of wireless devices, the DL transmission. Although the following description may be focused on 5G NR, the concepts described herein may be applicable to other similar areas, such as LTE, LTE-A, CDMA, GSM, and other wireless technologies.

Figures 2A, 2B, 2C, 2D:
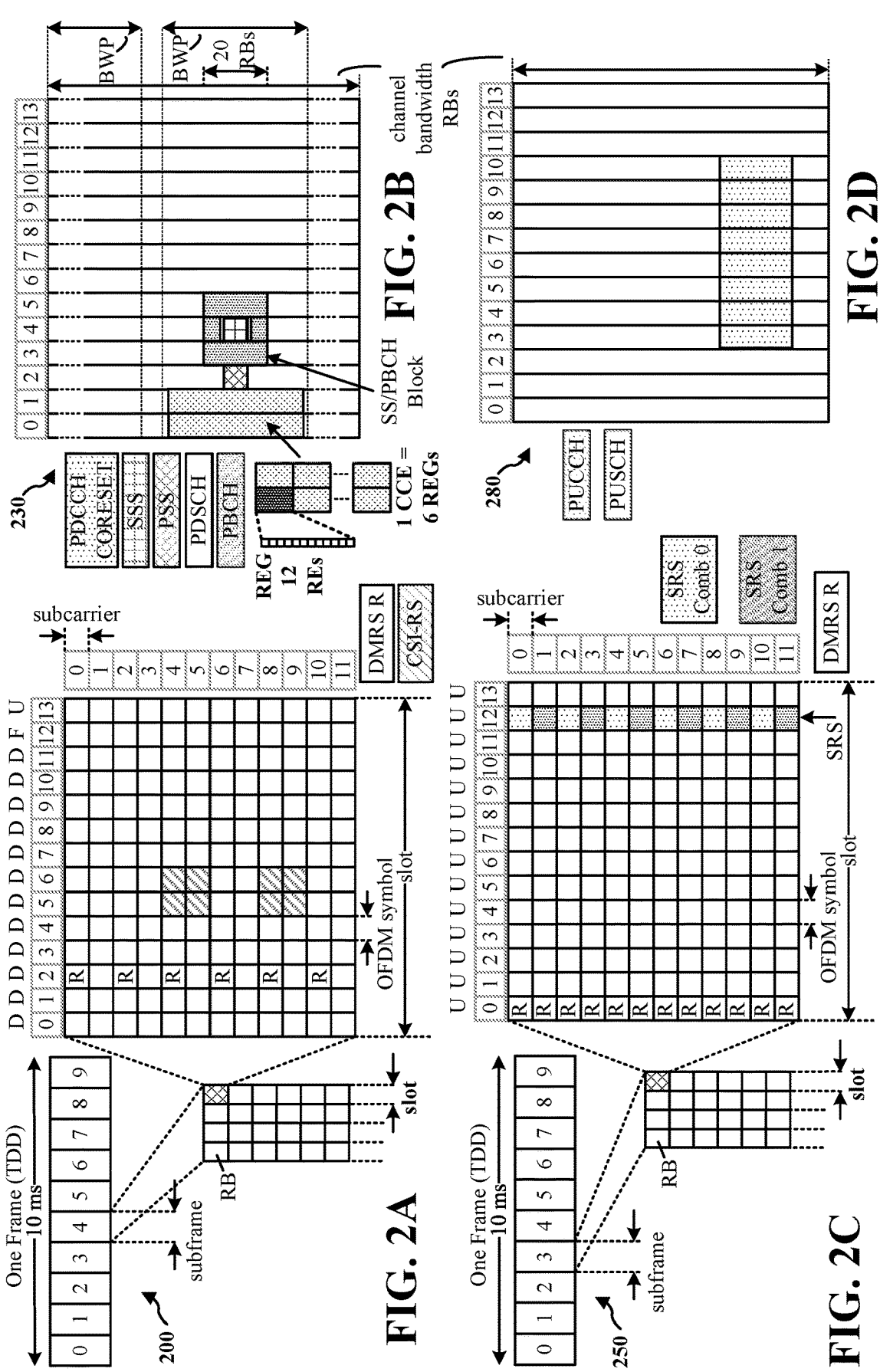
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| | Numerology, SCS, and CP | |
|---|---|---|
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
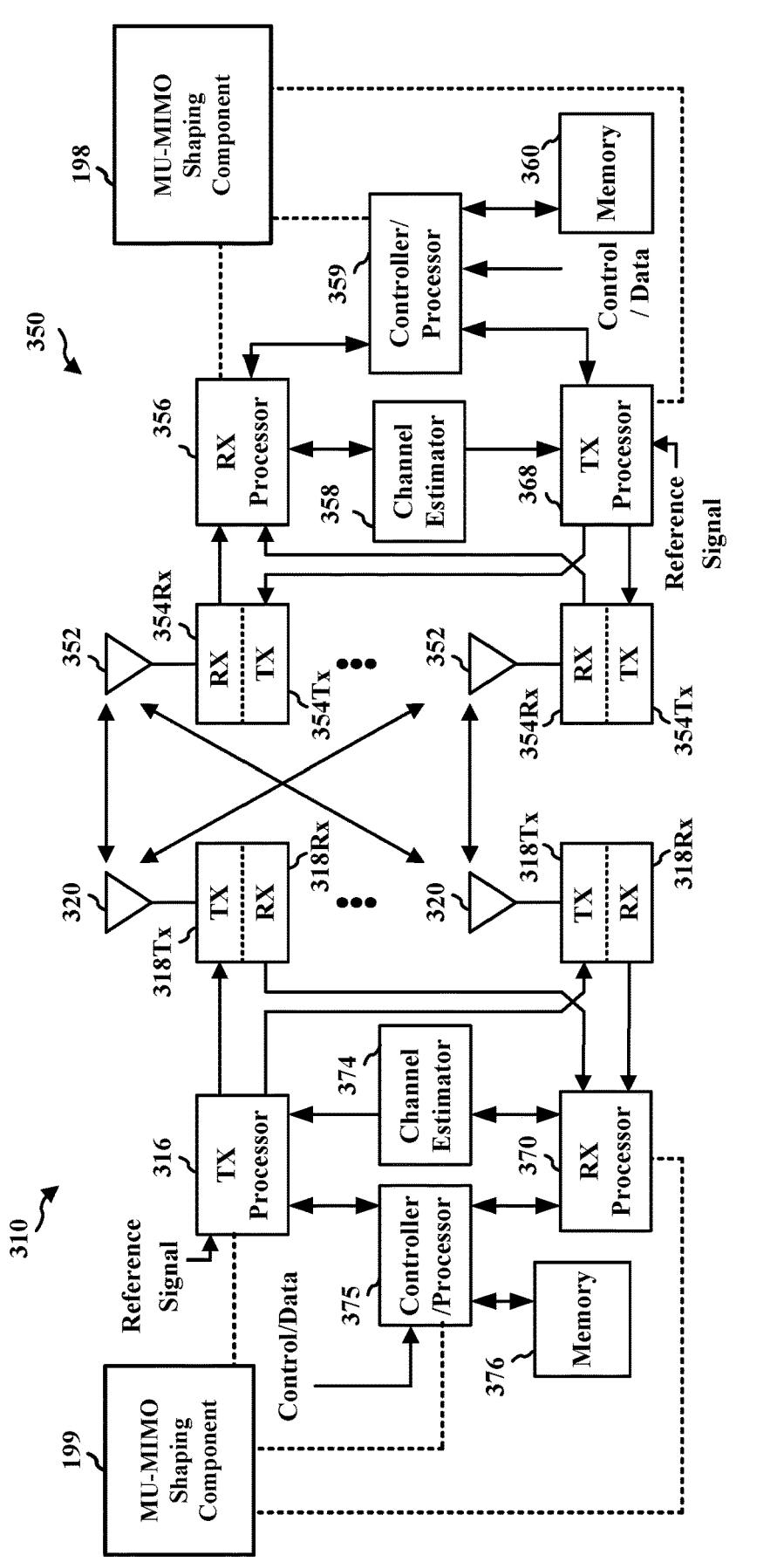
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antennas 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the MU-MIMO shaping component 198 of FIG. 1.

At least one of the TX processor 316, the RX processor 370, and the controller/processor 375 may be configured to perform aspects in connection with the MU-MIMO shaping component 199 of FIG. 1.

Figures 4A, 4B:
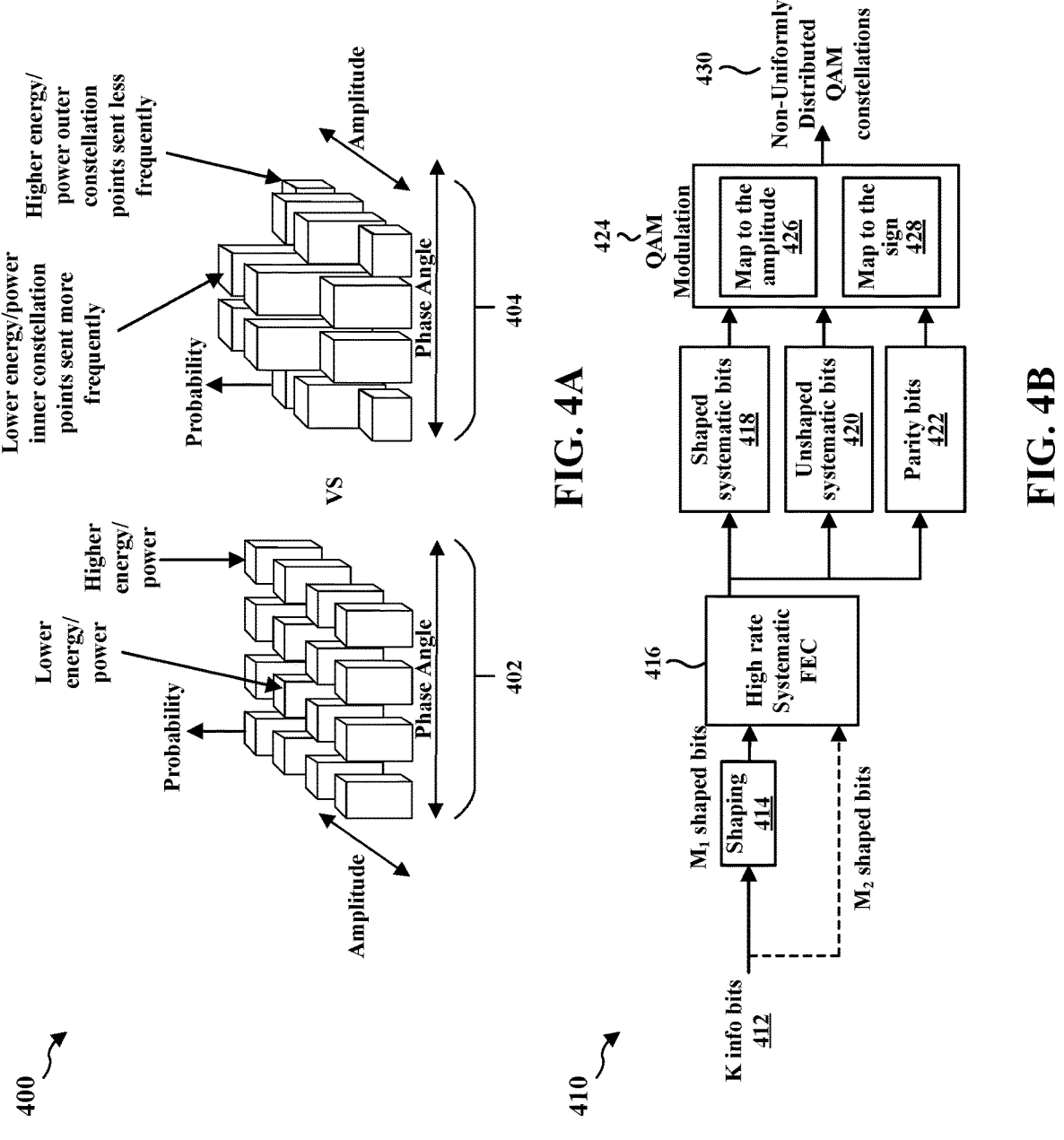
FIG. 4A is a diagram illustrating a first (unshaped and/or uniform) probability distribution among points in a constellation associated with a quadrature amplitude modulation (QAM) and a second (shaped) probability distribution among the points in the constellation associated with the QAM in accordance with some aspects of the disclosure.
FIG. 4B is a diagram illustrating a QAM including a shaping in accordance with some aspects of the disclosure.

As discussed above, in some aspects, a PS used to improve an AIR may be a PAS, where the distribution of the amplitude of the modulation constellation is shaped, and the sign of the constellation is kept uniform. FIG. 4A is a diagram 400 illustrating a first (unshaped and/or uniform) probability distribution 402 among points in a constellation associated with a QAM and a second (shaped) probability distribution 404 among the points in the constellation associated with the QAM in accordance with some aspects of the disclosure. As shown, the probability of lower-energy points in the constellation may be increased while the probability of higher-energy points in the constellation may be decreased. In some aspects, the modified probability may be associated with a modified scaling factor applied to the constellation points such that the average power of the transmitted signal has a unit power. The modified scaling factor associated with the modified probability may be such that the constellation points are more distinct (e.g., farther apart in a representation using amplitude as a first axis and phase angle as a second axis as illustrated in probability distribution 402 and probability distribution 404).

FIG. 4B is a diagram 410 illustrating a QAM including a shaping in accordance with some aspects of the disclosure. In some aspects applying a shaping operation, a shaping 414 (e.g., one of a PS, a GS, a PAS, or other shaping operation) may be applied to a set of K information bits 412 (to produce a corresponding set of $M_1$ shaped bits where $K<M_1$, and in some aspects an additional set of $M_2$ bits) prior to encoding. A systematic FEC 416 may be used, in some aspects, to preserve the shaping on the information bits, and map the parity bits to the sign of the constellation. For example, the systematic FEC 416 may produce a set of shaped systematic bits 418, a set of unshaped systematic bits 420, and a set of parity bits 422. The output of the systematic FEC 416, in some aspects, may then be modulated via QAM 424 including a first mapping 426 to an amplitude of the modulated symbol and a second mapping 428 to a sign of the symbol to produce a signal 430 associated with a non-uniformly distributed QAM constellation.

In some aspects, the constraints imposed by the shaping operation may increase the number of encoded symbols used to transmit a same amount of information (e.g., a same number of source bits). The increased number of encoded symbols may be associated with, or described using, a "shaping rate" based on a ratio between a first number of encoded symbols used to transmit a certain amount of information without shaping and a second number of encoded symbols used to transmit the same amount of information with shaping. In some aspects, the shaping may be associated with one or more of a shaping parameter, v, used to define a probability associated with each constellation point based on a Maxwell-Boltzmann distribution (e.g., $p(x) \sim e^{-v|x|^2}$), a shaping distribution (e.g., explicitly defined), a power scaling factor (e.g., a factor associated with the power/amplitude of individual constellation points used to ensure that the encoded transmission has a unit power), an MCS value associated with the encoded transmission, and/or a constellation set (i.e., the set of candidate modulation symbols/points/constellations associated with the geometric shaping operation).

If constellation shaping (e.g., a shaping operation) is used in association with a MU-MIMO communication, a first "user" of the multiple users (e.g., a first UE or a first wireless device) may receive a DL transmission associated with a subset of layers (e.g., spatial layers) of the MU-MIMO. Constellation shaping may refer to an energy efficiency enhancement method for digital signal modulation that may improve upon amplitude and phase-shift keying (APSK) and conventional quadrature amplitude modulation (QAM) by modifying the uniform distribution of the data symbols to match a channel. Constellation shaping may include a number of types of shaping (e.g., probabilistic shaping, geometric shaping, bit shaping, PS, PAS, GS, and/or other shaping operations). In order to demodulate and/or decode the relevant data and/or layers of the MU-MIMO, the first wireless device may benefit from knowing about the characteristics of signals associated with the other layers of the MU-MIMO communication (e.g., associated with other UEs or other wireless devices). For example, the first UE may be able to perform a joint demodulation based on a known modulation order (e.g., associated with an MCS), and/or parameters associated with a shaping operation, used for encoding a set of interfering layers (e.g., layers associated with one or more of the other UEs or wireless devices) of the MU-MIMO communication. Additionally, or alternatively, in some aspects, the first UE may benefit from knowing whether the set of interfering layers are associated with a shaping operation even without knowing about the specific shaping operation. For example, if the UE knows that the interfering layers are associated with a shaping operation but is not provided with information regarding the specific shaping operation, the UE may determine that a cost (in energy, latency, or other limited resource) of blind decoding to detect the distribution (or other aspects of the shaping operation) may not be worth the benefit (e.g., an improved accuracy) of performing the joint demodulation based on the detected information. Accordingly, the UE may determine to skip, and/or refrain from performing, the blind detecting and simply perform a demodulation without mitigating the interference based on knowledge of the shaping operation (where other interference mitigation may be performed based on other information at the UE).

Figure 5:
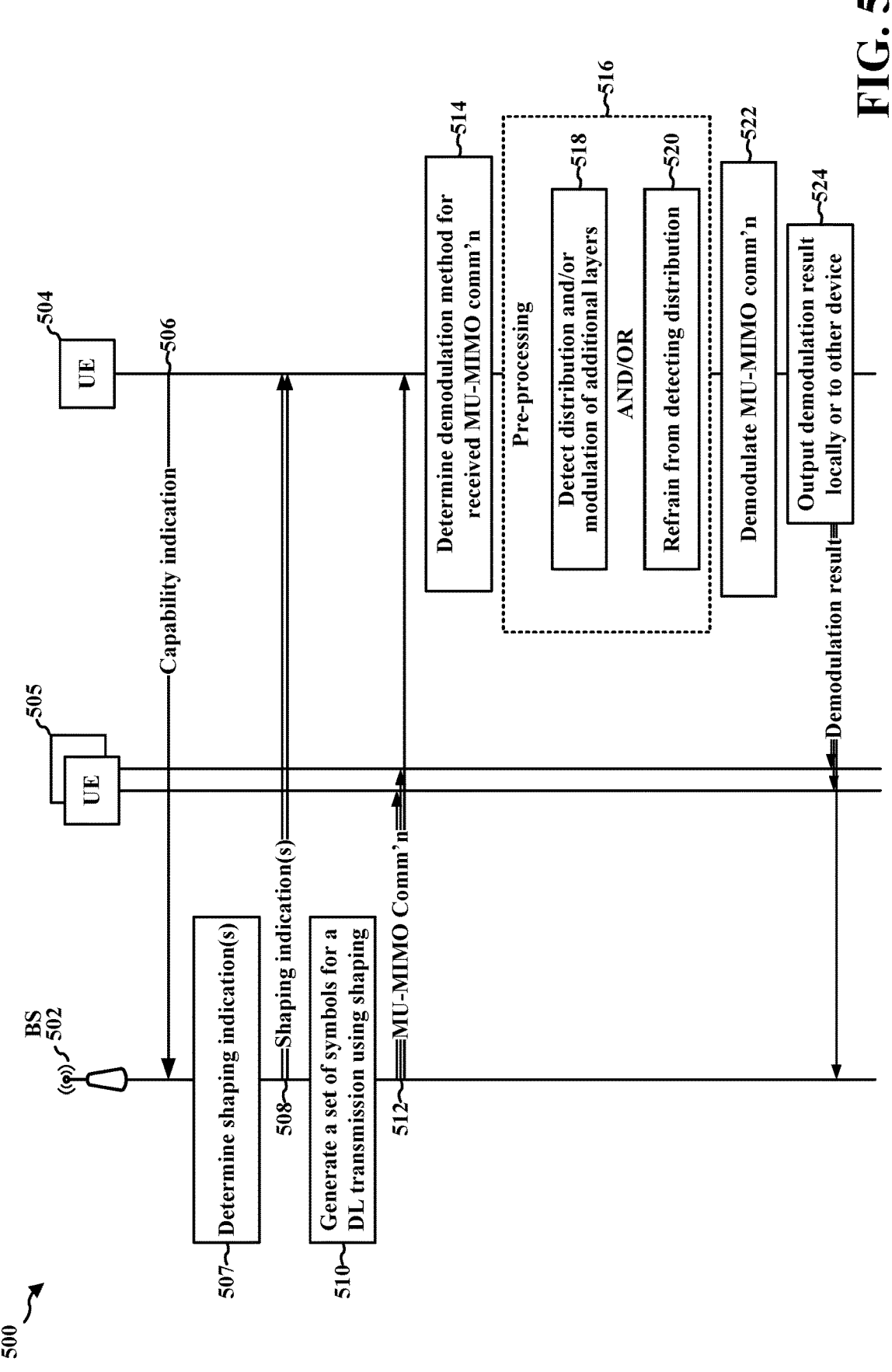
FIG. 5 is call flow diagram illustrating a method of wireless communication associated with shaping operations applied to one or more layers of a MU-MIMO communication in accordance with some aspects of the disclosure.

FIG. 5 is call flow diagram 500 illustrating a method of wireless communication associated with shaping operations applied to one or more layers of a MU-MIMO communication in accordance with some aspects of the disclosure. Call flow diagram 500 illustrates a base station 502 (e.g., as an example of a network device or network node that may include one or more components of a disaggregated base station) and a plurality of UEs (e.g., a UE 504 and a set of additional UEs 505 as examples of wireless devices) associated with a MU-MIMO communication. The functions ascribed to the base station 502, in some aspects, may be performed by one or more components of a network entity, a network node, or a network device (a single network entity/node/device or a disaggregated network entity/node/device as described above in relation to FIG. 1). Similarly, the functions ascribed to the UE 504, in some aspects, may be performed by one or more components of a wireless device supporting communication with a network entity/node/device.

Accordingly, references to "transmitting" in the description below may be understood to refer to a first component of the base station 502 (or the UE 504) outputting (or providing) an indication of the content of the transmission to be transmitted by a different component of the base station 502 (or the UE 504). Similarly, references to "receiving" in the description below may be understood to refer to a first component of the base station 502 (or the UE 504) receiving a transmitted signal and outputting (or providing) the received signal (or information based on the received signal) to a different component of the base station 502 (or the UE 504).

The UE 504, in some aspects, may transmit, and the base station 502 may receive, a capability indication 506. The capability indication 506, in some aspects, may indicate whether the UE 504 is capable of performing a joint demodulation among serving and interfering layers and/or whether the UE 504 is capable to perform blind detection of modulation order, shaping operation, or other aspects of the interfering layers. Based on the capabilities indicated via capability indication 506, the base station 502 may determine, at 507, the contents of one or more shaping indications 508 for the UE 504. For example, if the UE 504 indicates (e.g., via the capability indication 506) that it is not capable of performing a joint demodulation, the base station 502 may determine at 507 that the one or more shaping indications may include no information regarding the shaping operation (e.g., may be omitted) or may include information regarding a scrambling sequence associated with a DMRS of a co-scheduled UE (e.g., one or more UEs of the set of additional UEs 505).

However, if the UE 504 indicates (e.g., via the capability indication 506) that it is capable of performing a joint demodulation, the base station 502 may determine at 507 that the one or more shaping indications may include one or more of a characteristic of a shaping operation, an MCS value, or an MCS table associated with one or more interfering layers of the MU-MIMO. In some instances, the determination of the shaping indication may not be dependent on the UE capability. For example, the base station (e.g., gNB) may assume that a UE is capable of performing joint demodulation, and hence may send information about the shaping of the co-scheduled UEs/layers to the UE. The UE may then decide whether to make use of this information to improve its performance, or ignore the information and fall back to a default/simpler receiving mode. In some aspects, the amount, or type, of information may further be based on the indication of whether the UE 504 is capable to perform blind detection to determine each, or any, of the modulation order, the shaping operation (e.g., a distribution associated with the shaping operation and/or constellation set/points associated with geometric shaping), or other aspects of the interfering layers. For example, if the UE 504 is capable to perform blind detection of any of modulation order, shaping operations, shaping parameters, or other aspects of the interfering layers, the base station 502 may determine at 507 to omit the corresponding information that the UE 504 is capable of determining through the blind detection. In some aspects, even if the UE 504 is capable of using blind detection to determine a characteristic of an interfering layer, the base station may still determine at 507 to transmit the information based on other considerations and/or criteria such as power consumption or latency related to the blind detection.

Based on the determination at 507, the base station 502 may transmit, and the UE 504 may receive, a set of shaping indications 508. As described above, the set of shaping indications 508, in some aspects, may include indications of one or more of a set of characteristics of at least one shaping operation, an MCS value, and/or an MCS table. The set of characteristics of the at least one shaping operation, in some aspects, may include a shaping rate, a shaping parameter (e.g., v), a shaping distribution, or a power scaling factor. In some aspects, the set of additional UEs 505 may be assumed to be co-scheduled, where co-scheduled UEs may be assumed to be scheduled with a same DMRS scrambling sequence on other orthogonal DMRS ports (e.g., CDMed or FDMed), so that the UE 504 can perform channel estimation on those ports. In some aspects, where other UEs or layers of the MU-MIMO communication are associated with, or use, a different DMRS scrambling sequence the set of shaping indication may include one or more indications of the different DMRS scrambling sequences associated with the one or more interfering layers of the MU-MIMO.

The set of shaping indications 508, in some aspects, may additionally, or alternatively, include an indication of whether the interfering layers are associated with a shaping operation. For example, the set of shaping indications 508 may include one or more of an indication (e.g., a 1-bit indication) whether at least one interfering layer (e.g., a strongest interfering layer or any interfering layer) is associated with a shaping operation, an indication (e.g., a 1-bit indication) whether a majority of the layers (or interfering layers) is associated with a shaping operation, or, for each layer (or interfering layer), an indication (e.g., a multi-bit indication such as bitmap) whether the layer is associated with a shaping operation. In some aspects, the base station may be configured (e.g., constrained) to use a same shaping operation for each layer of a MU-MIMO and/or for each co-scheduled UE such that the use of the shaping operation for the serving layers indicates that the same shaping operation may be associated with each of the interfering layers.

In some aspects, the set of shaping indications 508 may include an indication of one or more of whether there are UEs that are co-scheduled with the first wireless device, a number of co-scheduled layers of the MU-MIMO communication, a number of UEs in the set of additional UEs 505, and/or a set of time-and-frequency resources associated with co-scheduled MU-MIMO communications with the set of additional UEs 505. The set of shaping indications 508, in some aspects, may be transmitted by the base station 502, and received by the UE 504, at least in part, via a second stage DCI. For example, if the base station 502 uses a two-stage DCI to schedule the MU-MIMO communication 512 discussed below, the set of shaping indications 508 may, at least in part, be transmitted in a second stage DCI to minimize overhead with a first stage DCI that may be rejected or otherwise be retransmitted before confirming a set of resources for the MU-MIMO communication 512 as the information in the set of shaping indications 508 may not be used for determining the resources identified in a first stage DCI but may be used for demodulation and can accordingly be transmitted in a later stage. In some aspects, a base station 502 may enforce scheduling restrictions such that the characteristics (e.g., the shaping operation distribution and/or MCS) of each layer are the same such that transmitting and/or receiving the set of shaping indications 508 may be omitted.

The base station 502 may, at 510, generate a set of signals (e.g., encoding a set of bits as illustrated in relation to FIG. 4B) for a DL transmission associated with the MU-MIMO communication. The base station 502 may generate the set of symbols at 510 based on a first shaping operation associated with the UE 504 and, in some aspects, at least one shaping operation associated with one or more interfering layers and/or one or more of the set of additional UEs 505. The base station 502 may transmit, and the UE 504 and the set of additional UEs 505 may receive, the MU-MIMO communication 512 (e.g., including the set of symbols generated at 510). Additionally, the shaping may be applied to the interference layers (i.e., applied to the transmissions to the set of additional UEs 505), but not applied to the transmission intended for the UE 504.

The UE 504, at 514, may determine a demodulation method for demodulating (and/or decoding) the MU-MIMO communication 512. In some aspects, the determination at 514 may be based on one or more of the capabilities of the UE 504 and/or the information included in the set of shaping indications 508. Based on the determination made at 514, the UE 504 may perform a set of pre-processing operations at 516. In some aspects, when the UE 504 is capable of performing a blind detection, the set of preprocessing operations at 516 may, at 518, include a (blind) detection of a distribution associated with a shaping operation, and/or a (blind) detection of a modulation (e.g., an MCS), used for at least one interfering layer. A blind detection, in some aspects, may be used to explore multiple possibilities for the distribution and/or modulation and select and/or identify a possibility that is a best fit and/or provides the best results. Additionally, a blind detection may blindly detect parameters associated with geometric shaping (e.g., to blind detect the set of constellation symbols used for geometric shaping). The multiple possibilities, in some aspects, may be based on knowledge of an MCS table indicated in the set of shaping indications 508 as being associated with one or more interfering layers of the MU-MIMO communication 512. In some aspects, the MCS table may define a list of MCS entries, where each MCS entry may define a set of coding/modulation/shaping parameters associated with a coding/modulation/shaping scheme. Also, knowing the MCS table is used for the interfering layers, the UE may blindly detect which MCS entry (or which subset of MCS entries) from the list of MCS entries are used on the interference layer. When the UE 504 is not capable of blind detection or if the set of shaping indications 508 includes sufficient information (or information that would otherwise be obtained by a blind decoding) for performing a joint demodulation without a blind detection, the set of preprocessing operations at 516 may include, at 520, omitting a (blind) detection of the distribution and/or modulation.

Based on one or more of the set of shaping indications 508 and or the pre-processing operations at 516, in some aspects, the UE 504 may, at 522, demodulate and/or decode the MU-MIMO communication 512 (e.g., the data and/or layers of the MU-MIMO communication 512 associated with the UE 504). For example, the UE 504, in some aspects, may demodulate the MU-MIMO communication 512 by performing a joint demodulation based on the distribution associated with the at least one shaping operation (or the modulation) indicated in the set of shaping indications 508 or detected and/or determined at 518. The demodulator performing demodulation, in some aspects, may be a non-linear demodulator (e.g., a sphere decoder). The UE 504, in some aspects, may demodulate the MU-MIMO communication 512 by performing a demodulation that does not consider knowledge of the interfering layers (e.g., without knowledge of a shaping operation associated with an interfering layer and/or the set of additional UEs 505). The data produced at 522 or data related to the data produced at 522 (e.g., feedback), in some aspects, may be output at 524 to a local storage and/or to one or more of the base station 502 and/or the set of additional UEs 505.

FIG. 6 is a flowchart 600 of a method of wireless communication. The method may be performed by a first wireless device such as a UE (e.g., the UE 104, 504; the apparatus 1004). In some aspects, the first wireless device may transmit, for a network node associated with MU-MIMO communication, at least one of a first additional indication that the first wireless device is capable of performing a joint demodulation based on an indication of at least one shaping operation or a second additional indication of whether the first wireless device is capable of performing a blind detection of at least one of an MCS or a parameter associated with the at least one shaping operation. In some aspects, the parameter associated with the with the at least one shaping operation may be a distribution associated with the at least one shaping operation. For example, referring to FIG. 5, the UE 504 may transmit the capability indication 506.

At 604, the first wireless device may receive an indication of at least one shaping operation associated with one or more additional wireless devices in a plurality of wireless devices. For example, 604 may be performed by application processor(s) 1006, cellular baseband processor(s) 1024, transceiver(s) 1022, antenna(s) 1080, and/or MU-MIMO shaping component 198 of FIG. 10. In some aspects, each of the plurality of wireless devices may be associated with MU-MIMO communication. The first wireless device, in some aspects, may be included in the plurality of wireless devices. In some aspects, the at least one shaping operation may be one of a probabilistic amplitude shaping operation or a geometric shaping operation. The indication of the at least one shaping operation, in some aspects, may include at least one of (1) a first single-bit indication of whether at least one layer of the MU-MIMO communication is associated with a shaping operation, (2) a second single-bit indication of whether a majority of layers of the MU-MIMO communication are associated with the shaping operation, or (3) one or more single-bit indications (that together make a multi-bit indication such as a bitmap) indicating whether the shaping operation is associated with a corresponding additional wireless device of the one or more additional wireless devices. In some aspects, the indication of the at least one shaping operation may include information regarding at least one MCS table associated with the one or more additional wireless devices.

In some aspects, the indication of the at least one shaping operation may include information regarding at least one of: a ratio between a first number of bits of data associated with the MU-MIMO communication before the at least one shaping operation and a second number of bits for transmission in association with the MU-MIMO communication after the at least one shaping operation, a shaping parameter, a distribution of symbols associated with the at least one shaping operation, a power scaling factor associated with the at least one shaping operation, and/or at least one MCS value associated with the at least one shaping operation for the one or more additional wireless devices. In some aspects, an MCS table may define a list of MCS entries, where each MCS entry may define a set of coding/modulation/shaping parameters associated with a coding/modulation/shaping scheme. Further, a UE may blindly detect which MCS entry (or which subset of MCS entries) from the list of MCS entries are used on the interference layer based on knowing the MCS table is used for the interfering layers. Also, an indication of at least one shaping operation may comprise information regarding at least one modulation and coding scheme (MCS) table associated with one or more additional wireless devices. The indication of the at least one shaping operation, in some aspects, may include information regarding one or more of: whether there are wireless devices that are co-scheduled with the first wireless device, a number of co-scheduled layers of the MU-MIMO communication, a number of wireless devices of the one or more additional wireless devices, and/or a set of time-and-frequency resources associated with co-scheduled MU-MIMO communications with the one or more additional wireless devices. In some aspects, receiving the indication of the at least one shaping operation at 604, in some aspects, may include receiving the indication, at least in part, via a second-stage DCI. For example, referring to FIG. 5, the UE 504 may receive the set of shaping indications 508.

In some aspects, the first wireless device may receive an additional indication of a scrambling sequence associated with at least one DMRS associated with the one or more additional wireless devices. In some aspects, a subsequent demodulation of a DL transmission may be based on the at least one DMRS. (e.g., a channel estimation performed based on the at least one DMRS) For example, referring to FIG. 5, the UE 504 may receive the set of shaping indications 508.

At 608, the first wireless device may receive a DL transmission associated with the MU-MIMO communication. For example, 608 may be performed by application processor(s) 1006, cellular baseband processor(s) 1024, transceiver(s) 1022, antenna(s) 1080, and/or MU-MIMO shaping component 198 of FIG. 10. The DL transmission associated with the MU-MIMO communication, in some aspects, may be associated with the plurality of wireless devices and may include one or more interfering layers associated with the at least one shaping operation. For example, referring to FIG. 5, the UE 504 may receive the MU-MIMO communication 512.

In some aspects, the first wireless device may collect information for a demodulation of the MU-MIMO communication received at 608. Collecting the information, in some aspects, may include refraining from detecting the distribution associated with the at least one shaping operation. In some aspects, the subsequent demodulation of the DL transmission may be a demodulation that does not consider knowledge of the at least one shaping operation associated with at least one of the at least one layer of the MU-MIMO communication, the majority of layers of the MU-MIMO communication, or the one or more additional wireless devices. Refraining from detecting the distribution, in some aspects, may be based on a determination that the demodulation may be performed without additional information beyond the information included in the indications received at one of 604 or 606. For example, referring to FIG. 5, the UE 504 may, at 520, omit a (blind) detection of the distribution and/or modulation.

Collecting the information, in some aspects, may include one or more of blindly detecting a distribution associated with the at least one shaping operation and/or blindly detecting a modulation order associated with at least one of the at least one layer of the MU-MIMO communication or at least one of the one or more additional wireless devices. In some aspects, the blind detection of the distribution associated with the at least one shaping operation and/or the modulation order may be based on the at least one MCS table received at 604. For example, referring to FIG. 5, the UE 504 may, at 520, omit a (blind) detection of the distribution and/or modulation.

At 614, the first wireless device may perform a demodulation of the DL transmission based on the indication. For example, 614 may be performed by application processor(s) 1006, cellular baseband processor(s) 1024, transceiver(s) 1022, antenna(s) 1080, and/or MU-MIMO shaping component 198 of FIG. 10. The demodulation of the DL transmission, in some aspects, may be a joint demodulation further based on one or more of the distribution associated with the at least one shaping operation and/or the modulation order. The demodulation of the DL transmission, in some aspects, may be based on a non-linear demodulator. In some aspects, the blind detection of the distribution associated with the at least one shaping operation and/or the modulation order may be based on the at least one MCS table received at 604. In some aspects, the demodulation of the DL transmission may be a demodulation that does not consider knowledge of the at least one shaping operation associated with at least one of the at least one layer of the MU-MIMO communication, the majority of layers of the MU-MIMO communication, or the one or more additional wireless devices. For example, referring to FIG. 5, the UE 504 may, at 522, demodulate and/or decode the MU-MIMO communication 512.

At 616, the first wireless device may output a result of the demodulation of the DL transmission for at least one of a transmission to at least one other wireless device or a local storage at the first wireless device. For example, 616 may be performed by application processor(s) 1006, cellular baseband processor(s) 1024, transceiver(s) 1022, antenna(s) 1080, and/or MU-MIMO shaping component 198 of FIG. 10. In some aspects, the result of the demodulation may be one of the data transmitted by the network node and/or an indication that the DL transmission was successfully received. For example, referring to FIG. 5, the UE 504 may, at 524, output the data produced at 522 or data related to the data produced at 522 (e.g., feedback) to a local storage and/or to one or more of the base station 502 and/or the set of additional UEs 505.

FIG. 7 is a flowchart 700 of a method of wireless communication. The method may be performed by a first wireless device such as a UE (e.g., the UE 104, 504; the apparatus 1004). At 702, the first wireless device may transmit, for a network node associated with MU-MIMO communication, at least one of a first additional indication that the first wireless device is capable of performing a joint demodulation based on an indication of at least one shaping operation or a second additional indication of whether the first wireless device is capable of performing a blind detection of at least one of an MCS or a parameter associated with the at least one shaping operation. For example, 702 may be performed by application processor(s) 1006, cellular baseband processor(s) 1024, transceiver(s) 1022, antenna(s) 1080, and/or MU-MIMO shaping component 198 of FIG. 10. In some aspects, the parameter associated with the with the at least one shaping operation may be a distribution associated with the at least one shaping operation. For example, referring to FIG. 5, the UE 504 may transmit the capability indication 506.

At 704, the first wireless device may receive an indication of at least one shaping operation associated with one or more additional wireless devices in a plurality of wireless devices. For example, 704 may be performed by application processor(s) 1006, cellular baseband processor(s) 1024, transceiver(s) 1022, antenna(s) 1080, and/or MU-MIMO shaping component 198 of FIG. 10. In some aspects, each of the plurality of wireless devices may be associated with MU-MIMO communication. The first wireless device, in some aspects, may be included in the plurality of wireless devices. In some aspects, the at least one shaping operation may be one of a probabilistic amplitude shaping operation or a geometric shaping operation. The indication of the at least one shaping operation, in some aspects, may include at least one of (1) a first single-bit indication of whether at least one layer of the MU-MIMO communication is associated with a shaping operation, (2) a second single-bit indication of whether a majority of layers of the MU-MIMO communication are associated with the shaping operation, or (3) one or more single-bit indications (that together make a multi-bit indication such as a bitmap) indicating whether the shaping operation is associated with a corresponding additional wireless device of the one or more additional wireless devices. In some aspects, the indication of the at least one shaping operation may include information regarding at least one MCS table associated with the one or more additional wireless devices.

In some aspects, the indication of the at least one shaping operation may include information regarding at least one of: a ratio between a first number of bits of data associated with the MU-MIMO communication before the at least one shaping operation and a second number of bits for transmission in association with the MU-MIMO communication after the at least one shaping operation, a shaping parameter, a distribution of symbols associated with the at least one shaping operation, a power scaling factor associated with the at least one shaping operation, and/or at least one MCS value associated with the at least one shaping operation for the one or more additional wireless devices. The indication of the at least one shaping operation, in some aspects, may include information regarding one or more of: whether there are wireless devices that are co-scheduled with the first wireless device, a number of co-scheduled layers of the MU-MIMO communication, a number of wireless devices of the one or more additional wireless devices, and/or a set of time-and-frequency resources associated with co-scheduled MU-MIMO communications with the one or more additional wireless devices. In some aspects, receiving the indication of the at least one shaping operation at 704, in some aspects, may include receiving the indication, at least in part, via a second-stage DCI. For example, referring to FIG. 5, the UE 504 may receive the set of shaping indications 508.

At 706, the first wireless device may receive an additional indication of a scrambling sequence associated with at least one DMRS associated with the one or more additional wireless devices. For example, 706 may be performed by application processor(s) 1006, cellular baseband processor(s) 1024, transceiver(s) 1022, antenna(s) 1080, and/or MU-MIMO shaping component 198 of FIG. 10. In some aspects, a subsequent demodulation of a DL transmission may be based on the at least one DMRS (e.g., a channel estimation performed based on the at least one DMRS). For example, referring to FIG. 5, the UE 504 may receive the set of shaping indications 508.

At 708, the first wireless device may receive a DL transmission associated with the MU-MIMO communication. For example, 708 may be performed by application processor(s) 1006, cellular baseband processor(s) 1024, transceiver(s) 1022, antenna(s) 1080, and/or MU-MIMO shaping component 198 of FIG. 10. The DL transmission associated with the MU-MIMO communication, in some aspects, may be associated with the plurality of wireless devices and may include one or more interfering layers associated with the at least one shaping operation. For example, referring to FIG. 5, the UE 504 may receive the MU-MIMO communication 512.

At 710, the first wireless device may collect information for a demodulation. For example, 710 may be performed by application processor(s) 1006, cellular baseband processor(s) 1024, transceiver(s) 1022, antenna(s) 1080, and/or MU-MIMO shaping component 198 of FIG. 10. Collecting the information at 710, in some aspects, may include refraining, at 711, from detecting the distribution associated with the at least one shaping operation. In some aspects, the subsequent demodulation of the DL transmission may be a demodulation that does not consider knowledge of the at least one shaping operation associated with at least one of the at least one layer of the MU-MIMO communication, the majority of layers of the MU-MIMO communication, or the one or more additional wireless devices. For example, 711 may be performed by application processor(s) 1006, cellular baseband processor(s) 1024, transceiver(s) 1022, antenna(s) 1080, and/or MU-MIMO shaping component 198 of FIG. 10. Refraining, at 711, from detecting the distribution, in some aspects, may be based on a determination that the demodulation may be performed without additional information beyond the information included in the indications received at one of 704 or 706. For example, referring to FIG. 5, the UE 504 may, at 520, omit a (blind) detection of the distribution and/or modulation.

Collecting the information at 710, in some aspects, may include one or more of blindly detecting, at 712, a distribution associated with the at least one shaping operation and/or blindly detecting, at 713, a modulation order associated with at least one of the at least one layer of the MU-MIMO communication or at least one of the one or more additional wireless devices. For example, 712 and/or 713 may be performed by application processor(s) 1006, cellular baseband processor(s) 1024, transceiver(s) 1022, antenna(s) 1080, and/or MU-MIMO shaping component 198 of FIG. 10. In some aspects, the blind detection of the distribution associated with the at least one shaping operation and/or the modulation order may be based on the at least one MCS table received at 704. For example, referring to FIG. 5, the UE 504 may, at 520, omit a (blind) detection of the distribution and/or modulation.

At 714, the first wireless device may perform a demodulation of the DL transmission based on the indication. For example, 714 may be performed by application processor(s) 1006, cellular baseband processor(s) 1024, transceiver(s) 1022, antenna(s) 1080, and/or MU-MIMO shaping component 198 of FIG. 10. The demodulation of the DL transmission, in some aspects, may be a joint demodulation further based on one or more of the distribution associated with the at least one shaping operation and/or the modulation order. The demodulation of the DL transmission, in some aspects, may be based on a non-linear demodulator. In some aspects, the blind detection of the distribution associated with the at least one shaping operation and/or the modulation order may be based on the at least one MCS table received at 704. In some aspects, the demodulation of the DL transmission may be a demodulation that does not consider knowledge of the at least one shaping operation associated with at least one of the at least one layer of the MU-MIMO communication, the majority of layers of the MU-MIMO communication, or the one or more additional wireless devices. For example, referring to FIG. 5, the UE 504 may, at 522, demodulate and/or decode the MU-MIMO communication 512.

At 716, the first wireless device may output a result of the demodulation of the DL transmission for at least one of a transmission to at least one other wireless device or a local storage at the first wireless device. For example, 716 may be performed by application processor(s) 1006, cellular baseband processor(s) 1024, transceiver(s) 1022, antenna(s) 1080, and/or MU-MIMO shaping component 198 of FIG. 10. In some aspects, the result of the demodulation may be one of the data transmitted by the network node and/or an indication that the DL transmission was successfully received. For example, referring to FIG. 5, the UE 504 may, at 524, output the data produced at 522 or data related to the data produced at 522 (e.g., feedback) to a local storage and/or to one or more of the base station 502 and/or the set of additional UEs 505.

FIG. 8 is a flowchart 800 of a method of wireless communication. The method may be performed by a network node such as a base station (e.g., the base station 102, 502; the network entity 1002, 1102). In some aspects, the network node may receive, from a first wireless device, at least one of a first additional indication that the first wireless device is capable of performing a joint demodulation based on an indication of at least one shaping operation or a second additional indication of whether the first wireless device is capable of performing a blind detection of at least one of an MCS or a parameter associated with the at least one shaping operation. For example, referring to FIG. 5, the base station 502 may receive the capability indication 506.

At 804, the network node may output, for the first wireless device, an indication of at least one shaping operation associated with one or more additional wireless devices in a plurality of wireless devices. For example, 804 may be performed by CU processor(s) 1112, DU processor(s) 1132, RU processor(s) 1142, transceiver(s) 1146, antenna(s) 1180, and/or MU-MIMO shaping component 199 of FIG. 11. In some aspects, each of the plurality of wireless devices may be associated with MU-MIMO communication. The first wireless device, in some aspects, may be included in the plurality of wireless devices. In some aspects, the at least one shaping operation may be one of a probabilistic amplitude shaping operation or a geometric shaping operation. The indication of the at least one shaping operation, in some aspects, may include at least one of (1) a first single-bit indication of whether at least one layer of the MU-MIMO communication is associated with a shaping operation, (2) a second single-bit indication of whether a majority of layers of the MU-MIMO communication are associated with the shaping operation, or (3) one or more single-bit indications (that together make a multi-bit indication such as a bitmap) indicating whether the shaping operation is associated with a corresponding additional wireless device of the one or more additional wireless devices. In some aspects, the indication of the at least one shaping operation may include information regarding at least one MCS table associated with the one or more additional wireless devices.

In some aspects, the indication of the at least one shaping operation may include information regarding at least one of: a ratio between a first number of bits of data associated with the MU-MIMO communication before the at least one shaping operation and a second number of bits for transmission in association with the MU-MIMO communication after the at least one shaping operation, a shaping parameter, a distribution of symbols associated with the at least one shaping operation, a power scaling factor associated with the at least one shaping operation, and/or at least one MCS value associated with the at least one shaping operation for the one or more additional wireless devices. The indication of the at least one shaping operation, in some aspects, may include information regarding one or more of: whether there are wireless devices that are co-scheduled with the first wireless device, a number of co-scheduled layers of the MU-MIMO communication, a number of wireless devices of the one or more additional wireless devices, and/or a set of time-and-frequency resources associated with co-scheduled MU-MIMO communications with the one or more additional wireless devices. In some aspects, outputting the indication of the at least one shaping operation at 804, in some aspects, may include outputting the indication, at least in part, via a second-stage DCI. For example, referring to FIG. 5, the base station 502 may transmit the set of shaping indications 508.

At 806 the network node may output, for the first wireless device, an additional indication of a scrambling sequence associated with at least one DMRS associated with the one or more additional wireless devices. For example, 806 may be performed by CU processor(s) 1112, DU processor(s) 1132, RU processor(s) 1142, transceiver(s) 1146, antenna(s) 1180, and/or MU-MIMO shaping component 199 of FIG. 11. In some aspects, the scrambling sequence may be associated with a demodulation of the DL transmission at the first wireless device (e.g., a channel estimation performed based on the at least one DMRS). For example, referring to FIG. 5, the base station 502 may output the set of shaping indications 508.

At 808 the network node may generate, based on a first shaping operation associated with the first wireless device and the at least one shaping operation, a set of symbols for a DL transmission associated with the MU-MIMO communication. For example, 808 may be performed by CU processor(s) 1112, DU processor(s) 1132, RU processor(s) 1142, transceiver(s) 1146, antenna(s) 1180, and/or MU-MIMO shaping component 199 of FIG. 11. In some aspects, the at least one shaping operation may be one of a probabilistic amplitude shaping operation or a geometric shaping operation. The first shaping operation and each shaping operation of the at least one shaping operation, in some aspects, may be a same shaping operation. In some aspects, the first shaping operation and the at least one shaping operation may be different shaping operations. For example, referring to FIG. 5, the base station 502 may generate the set of symbols at 510 based on a first shaping operation associated with the UE 504 and, in some aspects, at least one shaping operation associated with one or more interfering layers and/or one or more of the set of additional UEs 505 output the set of shaping indications 508.

At 810, the network node may output, for transmission to the plurality of wireless devices, the DL transmission. For example, 810 may be performed by CU processor(s) 1112, DU processor(s) 1132, RU processor(s) 1142, transceiver(s) 1146, antenna(s) 1180, and/or MU-MIMO shaping component 199 of FIG. 11. For example, referring to FIG. 5, the base station 502 may transmit the MU-MIMO communication 512.

FIG. 9 is a flowchart 900 of a method of wireless communication. The method may be performed by a network node such as a base station (e.g., the base station 102, 502; the network entity 1002, 1102). At 902, the network node may receive, from a first wireless device, at least one of a first additional indication that the first wireless device is capable of performing a joint demodulation based on an indication of at least one shaping operation or a second additional indication of whether the first wireless device is capable of performing a blind detection of at least one of an MCS or a parameter associated with the at least one shaping operation. For example, 902 may be performed by CU processor(s) 1112, DU processor(s) 1132, RU processor(s) 1142, transceiver(s) 1146, antenna(s) 1180, and/or MU-MIMO shaping component 199 of FIG. 11. For example, referring to FIG. 5, the base station 502 may receive the capability indication 506.

At 904, the network node may output, for the first wireless device, an indication of at least one shaping operation associated with one or more additional wireless devices in a plurality of wireless devices. For example, 904 may be performed by CU processor(s) 1112, DU processor(s) 1132, RU processor(s) 1142, transceiver(s) 1146, antenna(s) 1180, and/or MU-MIMO shaping component 199 of FIG. 11. In some aspects, each of the plurality of wireless devices may be associated with MU-MIMO communication. The first wireless device, in some aspects, may be included in the plurality of wireless devices. In some aspects, the at least one shaping operation may be one of a probabilistic amplitude shaping operation or a geometric shaping operation. The indication of the at least one shaping operation, in some aspects, may include at least one of (1) a first single-bit indication of whether at least one layer of the MU-MIMO communication is associated with a shaping operation, (2) a second single-bit indication of whether a majority of layers of the MU-MIMO communication are associated with the shaping operation, or (3) one or more single-bit indications (that together make a multi-bit indication such as a bitmap) indicating whether the shaping operation is associated with a corresponding additional wireless device of the one or more additional wireless devices. In some aspects, the indication of the at least one shaping operation may include information regarding at least one MCS table associated with the one or more additional wireless devices.

In some aspects, the indication of the at least one shaping operation may include information regarding at least one of: a ratio between a first number of bits of data associated with the MU-MIMO communication before the at least one shaping operation and a second number of bits for transmission in association with the MU-MIMO communication after the at least one shaping operation, a shaping parameter, a distribution of symbols associated with the at least one shaping operation, a power scaling factor associated with the at least one shaping operation, and/or at least one MCS value associated with the at least one shaping operation for the one or more additional wireless devices. The indication of the at least one shaping operation, in some aspects, may include information regarding one or more of: whether there are wireless devices that are co-scheduled with the first wireless device, a number of co-scheduled layers of the MU-MIMO communication, a number of wireless devices of the one or more additional wireless devices, and/or a set of time-and-frequency resources associated with co-scheduled MU-MIMO communications with the one or more additional wireless devices. In some aspects, outputting the indication of the at least one shaping operation at 904, in some aspects, may include outputting the indication, at least in part, via a second-stage DCI. For example, referring to FIG. 5, the base station 502 may transmit the set of shaping indications 508.

At 906 the network node may output, for the first wireless device, an additional indication of a scrambling sequence associated with at least one DMRS associated with the one or more additional wireless devices. For example, 906 may be performed by CU processor(s) 1112, DU processor(s) 1132, RU processor(s) 1142, transceiver(s) 1146, antenna(s) 1180, and/or MU-MIMO shaping component 199 of FIG. 11. In some aspects, the scrambling sequence may be associated with a demodulation of the DL transmission at the first wireless device (e.g., a channel estimation performed based on the at least one DMRS). For example, referring to FIG. 5, the base station 502 may output the set of shaping indications 508.

At 908 the network node may generate, based on a first shaping operation associated with the first wireless device and the at least one shaping operation, a set of symbols for a DL transmission associated with the MU-MIMO communication. For example, 908 may be performed by CU processor(s) 1112, DU processor(s) 1132, RU processor(s) 1142, transceiver(s) 1146, antenna(s) 1180, and/or MU-MIMO shaping component 199 of FIG. 11. In some aspects, the at least one shaping operation may be one of a probabilistic amplitude shaping operation or a geometric shaping operation. The first shaping operation and each shaping operation of the at least one shaping operation, in some aspects, may be a same shaping operation. In some aspects, the first shaping operation and the at least one shaping operation may be different shaping operations. For example, referring to FIG. 5, the base station 502 may generate the set of symbols at 510 based on a first shaping operation associated with the UE 504 and, in some aspects, at least one shaping operation associated with one or more interfering layers and/or one or more of the set of additional UEs 505 output the set of shaping indications 508.

At 910, the network node may output, for transmission to the plurality of wireless devices, the DL transmission. For example, 910 may be performed by CU processor(s) 1112, DU processor(s) 1132, RU processor(s) 1142, transceiver(s) 1146, antenna(s) 1180, and/or MU-MIMO shaping component 199 of FIG. 11. For example, referring to FIG. 5, the base station 502 may transmit the MU-MIMO communication 512.

Figure 10:
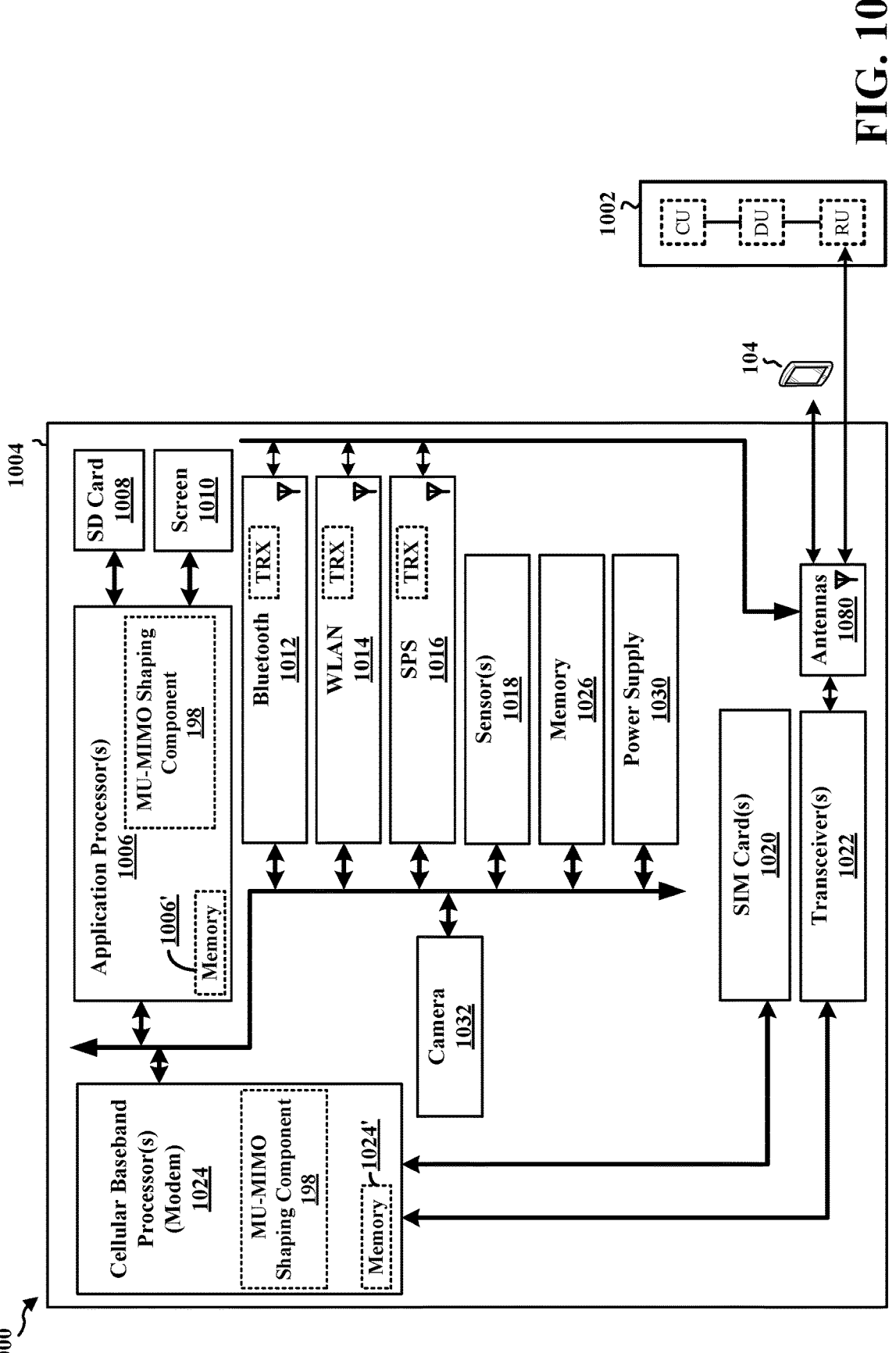
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include at least one cellular baseband processor 1024 (also referred to as a modem) coupled to one or more transceivers 1022 (e.g., cellular RF transceiver). The cellular baseband processor(s) 1024 may include at least one on-chip memory 1024'. In some aspects, the apparatus 1004 may further include one or more subscriber identity modules (SIM) cards 1020 and at least one application processor 1006 coupled to a secure digital (SD) card 1008 and a screen 1010. The application processor(s) 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize one or more antennas 1080 for communication. The cellular baseband processor(s) 1024 communicates through the transceiver(s) 1022 via the one or more antennas 1080 with the UE 104 and/or with an RU associated with a network entity 1002. The cellular baseband processor(s) 1024 and the application processor(s) 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor(s) 1024 and the application processor(s) 1006 are each responsible for general processing, including the execution of software stored on the computer-readable medium/memory. The software, when executed by the cellular baseband processor(s) 1024/application processor(s) 1006, causes the cellular baseband processor(s) 1024/application processor(s) 1006 to perform the various functions described supra. The computer-readable medium/memory may also be used for storing data that is manipulated by the cellular baseband processor(s) 1024/application processor(s) 1006 when executing software. The cellular baseband processor(s) 1024/application processor(s) 1006 may be a component of the UE 350 and may include the at least one memory 360 and/or at least one of the TX processor 368, the RX processor 356, and the controller/processor 359. In one configuration, the apparatus 1004 may be at least one processor chip (modem and/or application) and include just the cellular baseband processor(s) 1024 and/or the application processor(s) 1006, and in another configuration, the apparatus 1004 may be the entire UE (e.g., see UE 350 of FIG. 3) and include the additional modules of the apparatus 1004.

As discussed supra, the MU-MIMO shaping component 198 may be configured to receive an indication of at least one shaping operation associated with one or more additional wireless devices in a plurality of wireless devices, where each of the plurality of wireless devices is associated with MU-MIMO communication, and where the first wireless device is included in the plurality of wireless devices. The MU-MIMO shaping component 198 may be configured to receive a DL transmission associated with the MU-MIMO communication, perform a demodulation of the DL transmission based on the indication, and output a result of the demodulation of the DL transmission for at least one of a transmission to at least one other wireless device or a local storage at the first wireless device. The MU-MIMO shaping component 198 may be within the cellular baseband processor(s) 1024, the application processor(s) 1006, or both the cellular baseband processor(s) 1024 and the application processor(s) 1006. The MU-MIMO shaping component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1004 may include a variety of components configured for various functions. In one configuration, the apparatus 1004, and in particular the cellular baseband processor(s) 1024 and/or the application processor(s) 1006, may include means for receiving an indication of at least one shaping operation associated with one or more additional wireless devices in a plurality of wireless devices. In some aspects, the apparatus 1004, and in particular the cellular baseband processor(s) 1024 and/or the application processor(s) 1006, may include means for receiving a DL transmission associated with the MU-MIMO communication. In some aspects, the apparatus 1004, and in particular the cellular baseband processor(s) 1024 and/or the application processor(s) 1006, may include means for performing a demodulation of the DL transmission based on the indication. In some aspects, the apparatus 1004, and in particular the cellular baseband processor(s) 1024 and/or the application processor(s) 1006, may include means for outputting a result of the demodulation of the DL transmission for at least one of a transmission to at least one other wireless device or a local storage at the first wireless device. In some aspects, the apparatus 1004, and in particular the cellular baseband processor(s) 1024 and/or the application processor(s) 1006, may include means for blindly detecting a distribution associated with the at least one shaping operation. In some aspects, the apparatus 1004, and in particular the cellular baseband processor(s) 1024 and/or the application processor(s) 1006, may include means for refraining from detecting the distribution associated with the at least one shaping operation. In some aspects, the apparatus 1004, and in particular the cellular baseband processor (s) 1024 and/or the application processor(s) 1006, may include means for blindly detecting a modulation order associated with at least one of the at least one layer of the MU-MIMO communication or at least one of the one or more additional wireless devices. In some aspects, the apparatus 1004, and in particular the cellular baseband processor(s) 1024 and/or the application processor(s) 1006, may include means for receiving an additional indication of a scrambling sequence associated with at least one DMRS associated with the one or more additional wireless devices. In some aspects, the apparatus 1004, and in particular the cellular baseband processor(s) 1024 and/or the application processor(s) 1006, may include means for transmitting, for a network node associated with the MU-MIMO communication, at least one of a first additional indication that the first wireless device is capable of performing a joint demodulation based on the indication of the at least one shaping operation or a second additional indication of whether the first wireless device is capable of performing a blind detection of at least one of an MCS or a parameter associated with the at least one shaping operation. The means may be the MU-MIMO shaping component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means or as described in relation to FIGS. 6 and 7.

Figure 11:
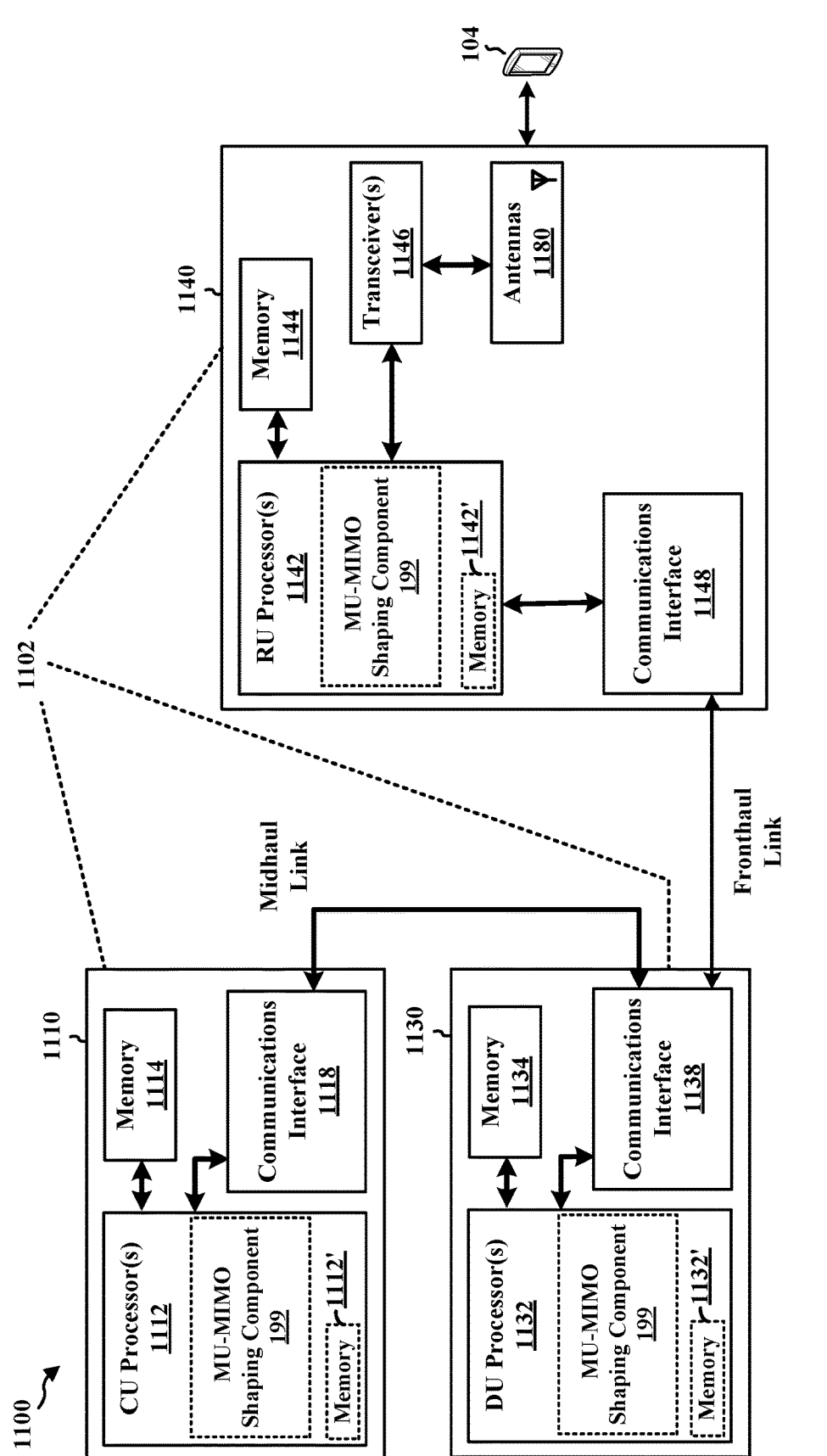
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the MU-MIMO shaping component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include at least one CU processor 1112. The CU processor(s) 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include at least one DU processor 1132. The DU processor(s) 1132 may include on-chip memory 1132'. In some aspects, the DU 1130 may further include additional memory modules 1134 and a communications interface 1138. The DU 1130 communicates with the RU 1140 through a fronthaul link. The RU 1140 may include at least one RU processor 1142. The RU processor(s) 1142 may include on-chip memory 1142'. In some aspects, the RU 1140 may further include additional memory modules 1144, one or more transceivers 1146, one or more antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the MU-MIMO shaping component 199 may be configured to output, for a first wireless device, an indication of at least one shaping operation associated with one or more additional wireless devices in a plurality of wireless devices, where each of the plurality of wireless devices is associated with MU-MIMO communication, and where the first wireless device is included in the plurality of wireless devices. The MU-MIMO shaping component 199 may be configured to generate, based on a first shaping operation associated with the first wireless device and the at least one shaping operation, a set of symbols for a DL transmission associated with the MU-MIMO communication and output, for transmission to the plurality of wireless devices, the DL transmission. The MU-MIMO shaping component 199 may be within one or more processors of one or more of the CU 1110, DU 1130, and the RU 1140. The MU-MIMO shaping component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1102 may include a variety of components configured for various functions. In one configuration, the network entity 1102 may include means for outputting, for a first wireless device, an indication of at least one shaping operation associated with one or more additional wireless devices in a plurality of wireless devices. In one configuration, the network entity 1102 may include means for generating, based on a first shaping operation associated with the first wireless device and the at least one shaping operation, a set of symbols for a DL transmission associated with the MU-MIMO communication. In one configuration, the network entity 1102 may include means for outputting, for transmission to the plurality of wireless devices, the DL transmission. In one configuration, the network entity 1102 may include means for outputting, for the first wireless device, an additional indication of a scrambling sequence associated with at least one DMRS associated with the one or more additional wireless devices. In one configuration, the network entity 1102 may include means for receiving, from the first wireless device, at least one of a first additional indication that the first wireless device is capable of performing a joint demodulation based on the indication of the at least one shaping operation or a second additional indication of whether the first wireless device is capable of performing a blind detection of at least one of a MCS or a parameter associated with the at least one shaping operation. The means may be the MU-MIMO shaping component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 8 and 9.

The disclosure presents techniques for MU-MIMO with Probabilistic Amplitude Shaping (PAS). The disclosure establishes possible signaling of the PAS for advanced receivers to be able to demodulate both its own signal and the interferer signal.

In some aspects, e.g., related to 5G (up to Rel-17), for UEs with advanced MU receivers for a MU-MIMO, a UE may blindly detect the presence of MU interference (e.g., associated with co-scheduled users or UEs) and/or a modulation order (e.g., an MCS) associated with the MU interference. The blind detection, in some aspects, may be used to perform joint demodulation across the signals for the UE and the MU interferences. If the MU-MIMO further is associated with a constellation shaping operation (e.g., one of the PS, PAS, GS, or other shaping operation), the joint demodulation may be further complicated by the shaping operation. For example, the UE may detect the presence of the MU interference, the modulation order, and the shaping operation. In some aspects, network-assisted signaling may be used to reduce MU detection complexity associated with a MU-MIMO incorporating a shaping operation.

Some aspects more specifically relate to signaling to support MU-MIMO incorporating a shaping operation. In some examples, a first wireless device may transmit, and a network node may receive, a first capability indication that the first wireless device is capable of performing a joint demodulation based on an indication of at least one shaping operation or a second capability indication of whether the first wireless device is capable of performing a blind detection of at least one of an MCS or a parameter associated with the at least one shaping operation. Based on one or more of the first capability indication or the second capability indication, the network node may transmit, and the wireless device may receive, an indication of at least one shaping operation associated with one or more additional wireless devices in a plurality of wireless devices. In some aspects, each of the plurality of wireless devices is associated with MU-MIMO communication and the first wireless device is included in the plurality of wireless devices. The network node, in some aspects, may generate, based on a first shaping operation associated with the first wireless device and the at least one shaping operation, a set of symbols for a DL transmission associated with the MU-MIMO communication. In some aspects, the network node may output, for transmission to the plurality of wireless devices, the (generated) DL transmission and the first wireless device may receive the DL transmission associated with the MU-MIMO communication, perform a demodulation of the DL transmission based on the indication (e.g., the indicated at least one shaping operation), and may output a result of the demodulation of the DL transmission for at least one of a transmission to at least one other wireless device (or network nodes) or a local storage at the first wireless device.

Particular aspects of the subject matter described in this disclosure can be implemented to realize one or more of the following potential advantages. In some examples, by providing signaling of a shaping operation associated with an MU-MIMO, the described techniques can be used to provide significant performance benefit (e.g., a >2 dB shaping gain relative to uniform QAM, blind MU modulation order detection, and/or advanced MIMO receiver), and/or complexity saving (relative to blind MU PAS information detection), at the expense of very minor signaling overhead (e.g., one, to a few, bits per DL transmission) from a network node (e.g., a base station) to the wireless device.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device, comprising: receiving an indication of at least one shaping operation associated with one or more additional wireless devices in a plurality of wireless devices, wherein each of the plurality of wireless devices is associated with multiple user multiple input multiple output (MU-MIMO) communication, and wherein the first wireless device is included in the plurality of wireless devices; receiving a downlink (DL) transmission associated with the MU-MIMO communication; performing a demodulation of the DL transmission based on the indication; and outputting a result of the demodulation of the DL transmission for at least one of a transmission to at least one other wireless device or a local storage at the first wireless device.

Aspect 2 is the method of aspect 1, wherein the at least one shaping operation is one of a probabilistic amplitude shaping operation or a geometric shaping operation, and wherein the indication of the at least one shaping operation comprises at least one of (1) a first single-bit indication of whether at least one layer of the MU-MIMO communication is associated with a shaping operation, (2) a second single-bit indication of whether a majority of layers of the MU-MIMO communication are associated with the shaping operation, or (3) one or more single-bit indications indicating whether the shaping operation is associated with a corresponding additional wireless device of the one or more additional wireless devices.

Aspect 3 is the method of aspect 2, wherein the indication indicates at least one of (1) that the at least one layer of the MU-MIMO communication is associated with the shaping operation, (2) that the majority of layers of the MU-MIMO communication are associated with the shaping operation, (3) that the shaping operation is associated with at least one of the one or more additional wireless devices, the method further comprising one of: detecting a distribution associated with the at least one shaping operation, wherein the demodulation of the DL transmission is a demodulation further based on the distribution associated with the at least one shaping operation, wherein the demodulation is configured to demodulate the DL transmission based on the distribution associated with the at least one shaping operation; or refraining from detecting the distribution associated with the at least one shaping operation, wherein the demodulation of the DL transmission is a demodulation that does not consider knowledge of the at least one shaping operation associated with at least one of the at least one layer of the MU-MIMO communication, the majority of layers of the MU-MIMO communication, or the one or more additional wireless devices.

Aspect 4 is the method of aspect 1, wherein the at least one shaping operation is at least one constellation shaping operation, and wherein the indication of the at least one shaping operation comprises information regarding at least one modulation and coding scheme (MCS) table associated with the one or more additional wireless devices.

Aspect 5 is the method of aspect 4, wherein detecting the distribution is based on the at least one MCS table.

Aspect 6 is the method of aspect 2, wherein the indication indicates at least one of (1) that the at least one layer of the MU-MIMO communication is not associated with the shaping operation, (2) that the majority of layers of the MU-MIMO communication are not associated with the shaping operation, (3) that the shaping operation is not associated with the one or more additional wireless devices, the method further comprising: detecting a modulation order associated with at least one of the at least one layer of the MU-MIMO communication or at least one of the one or more additional wireless devices, wherein the demodulation of the DL transmission is a demodulation further based on the modulation order.

Aspect 7 is the method of any of aspects 1 to 5, wherein the indication of the at least one shaping operation comprises information regarding at least one of: a shaping rate, wherein the shaping rate is associated with a ratio between a first number of bits of data associated with the MU-MIMO communication before the at least one shaping operation and a second number of bits for transmission in association with the MU-MIMO communication after the at least one shaping operation; a shaping parameter; a distribution of symbols associated with the at least one shaping operation; a power scaling factor associated with the at least one shaping operation; or at least one modulation and coding scheme (MCS) value associated with the at least one shaping operation for the one or more additional wireless devices.

Aspect 8 is the method of any of aspects 1 to 5 and 7, further comprising: receiving an additional indication of a scrambling sequence associated with at least one demodulation reference signal (DMRS) associated with the one or more additional wireless devices, wherein the demodulation of the DL transmission is based on the at least one DMRS.

Aspect 9 is the method of any of aspects 1 to 8, wherein the indication of the at least one shaping operation comprises information regarding one or more of: whether there are wireless devices that are co-scheduled with the first wireless device; a number of co-scheduled layers of the MU-MIMO communication; a number of wireless devices of the one or more additional wireless devices; or a set of time-and-frequency resources associated with co-scheduled MU-MIMO communications with the one or more additional wireless devices.

Aspect 10 is the method of any of aspects 1 to 9, further comprising receiving a second transmission along with the DL transmission, wherein the second transmission is associated with the one or more additional wireless devices, and wherein receiving the indication of the at least one shaping operation comprises receiving the indication, at least in part, via a second stage DL control information (DCI) of a multi-stage-multi state-DCI procedure (e.g., a 2-stage DCI).

Aspect 11 is the method of any of aspects 1 to 10, further comprising: transmitting, for a network node associated with the MU-MIMO communication, at least one of a first additional indication that the first wireless device is capable of performing a demodulation based on the indication of the at least one shaping operation or a second additional indication of whether the first wireless device is capable of performing a blind detection of at least one of a modulation and coding scheme (MCS) or a parameter associated with the at least one shaping operation.

Aspect 12 is the method of any of aspects) 1 to 11, wherein the demodulation of the DL transmission is based on a non-linear demodulator.

Aspect 13 is a method of wireless communication at a network node, comprising: outputting, for a first wireless device, an indication of at least one shaping operation associated with one or more additional wireless devices in a plurality of wireless devices, wherein each of the plurality of wireless devices is associated with multiple user multiple input multiple output (MU-MIMO) communication, and wherein the first wireless device is included in the plurality of wireless devices; generating, based on a first shaping operation associated with the first wireless device and the at least one shaping operation, a set of symbols for a DL transmission associated with the MU-MIMO communication; and outputting, for transmission to the plurality of wireless devices, the DL transmission.

Aspect 14 is the method of aspect 13, wherein the indication of the at least one shaping operation comprises at least one of (1) a first single-bit indication of whether at least one layer of the MU-MIMO communication is associated with a shaping operation, (2) a second single-bit indication indicating whether a majority of layers of the MU-MIMO communication are associated with the shaping operation, or (3) one or more single-bit indications indicating whether the shaping operation is associated with a corresponding additional wireless device of the one or more wireless devices.

Aspect 15 is the method of any of aspects 13 and 14, wherein the at least one shaping operation is at least one constellation shaping operation, and wherein the indication of the at least one shaping operation comprises information regarding at least one modulation and coding scheme (MCS) table associated with the one or more additional wireless devices.

Aspect 16 is the method of any of aspects) 13 to 15, wherein the indication of the at least one shaping operation comprises information regarding at least one of: a shaping rate; a distribution of symbols associated with the at least one shaping operation; a power scaling factor associated with the at least one shaping operation; or at least one modulation and coding scheme (MCS) value associated with the at least one shaping operation for the one or more additional wireless devices.

Aspect 17 is the method of any of aspects 13 to 16, further comprising: outputting, for the first wireless device, an additional indication of a scrambling sequence associated with at least one demodulation reference signal (DMRS) associated with the one or more additional wireless devices, wherein the scrambling sequence is associated with a demodulation of the DL transmission at the first wireless device.

Aspect 18 is the method of any of aspects 13 to 17, wherein the indication of the at least one shaping operation comprises information regarding one or more of: whether there are wireless devices that are co-scheduled with the first wireless device; a number of co-scheduled layers of the MU-MIMO communication; a number of wireless devices of the one or more additional wireless devices; or a set of time-and-frequency resources associated with co-scheduled MU-MIMO communications with the one or more additional wireless devices.

Aspect 19 is the method of any of aspects 13 to 18, wherein the at least one processor, individually or in any combination, is further configured to: transmit a second transmission along with the DL transmission, wherein the second transmission is associated with one or more additional wireless devices, and wherein outputting the indication of the at least one shaping operation comprises outputting the indication, at least in part, in association with a second stage DL control information (DCI) of a multi-stage DCI procedure (e.g., a 2-stage DCI).

Aspect 20 is the method of any of aspects 13 to 19, further comprising: receiving, from the first wireless device, at least one of a first additional indication that the first wireless device is capable of performing a demodulation based on the indication of the at least one shaping operation or a second additional indication of whether the first wireless device is capable of performing a blind detection of at least one of a modulation and coding scheme (MCS) or a parameter associated with the at least one shaping operation.

Aspect 21 is the method of any of aspects 13 to 20, wherein the at least one shaping operation is one of a probabilistic amplitude shaping operation or a geometric shaping operation.

Aspect 22 is the method of any of aspects 13 to 21, wherein the first shaping operation and each shaping operation of the at least one shaping operation is a same shaping operation.

Aspect 23 is the method of any of aspects 13 to 21, wherein the first shaping operation and the at least one shaping operation are different shaping operations.

Aspect 24 is an apparatus for wireless communication at a device including a memory and at least one processor coupled to the memory and, based at least in part on information stored in the memory, the at least one processor is configured to implement any of aspects 1 to 12.

Aspect 25 is the apparatus of aspect 24, further including a transceiver or an antenna coupled to the at least one processor.

Aspect 26 is an apparatus for wireless communication at a device including means for implementing any of aspects 1 to 12.

Aspect 27 is a computer-readable medium (e.g., a non-transitory computer-readable medium) storing computer executable code, where the code when executed by a processor causes the processor to implement any of aspects 1 to 12.

Aspect 28 is an apparatus for wireless communication at a device including a memory and at least one processor coupled to the memory and, based at least in part on information stored in the memory, the at least one processor is configured to implement any of aspects 13 to 23.

Aspect 29 is the apparatus of aspect 28, further including a transceiver or an antenna coupled to the at least one processor.

Aspect 30 is an apparatus for wireless communication at a device including means for implementing any of aspects 13 to 23.

Aspect 31 is a computer-readable medium (e.g., a non-transitory computer-readable medium) storing computer executable code, where the code when executed by a processor causes the processor to implement any of aspects 13 to 23.

What is claimed is:

1. An apparatus for wireless communication at a first wireless device, comprising:
   at least one memory; and
   at least one processor coupled to the at least one memory and, based at least in part on stored information that is stored in the at least one memory, the at least one processor is configured to:
   receive an indication of a non-uniform distribution of symbols associated with at least one shaping operation associated with one or more layers of a quadrature amplitude modulated (QAM) multiple user multiple input multiple output (MU-MIMO) communication, wherein the one or more layers of the QAM MU-MIMO communication are associated with one or more additional wireless devices in a plurality of wireless devices, wherein each of the plurality of wireless devices is a co-scheduled wireless device associated with a layer of the QAM MU-MIMO communication, and wherein the first wireless device is included in the plurality of wireless devices;
   receive, from a network node, the QAM MU-MIMO communication;
   perform a demodulation of the QAM MU-MIMO communication based on the indication; and
   output a result of the demodulation of the QAM MU-MIMO communication for at least one of a transmission to at least one other wireless device or a local storage at the first wireless device.

2. The apparatus of claim 1, wherein the at least one shaping operation is one of a probabilistic amplitude shaping operation or a geometric shaping operation, and wherein the indication of the at least one shaping operation comprises at least one of:
   (1) a first single-bit indication of whether at least one layer of the QAM MU-MIMO communication is associated with a shaping operation,
   (2) a second single-bit indication of whether a majority of layers of the QAM MU-MIMO communication are associated with the shaping operation, or
   (3) one or more single-bit indications indicating whether the shaping operation is associated with a corresponding additional wireless device of the one or more additional wireless devices.

3. The apparatus of claim 2, wherein the indication indicates at least one of (1) that the at least one layer of the QAM MU-MIMO communication is associated with the shaping operation, (2) that the majority of layers of the QAM MU-MIMO communication are associated with the shaping operation, (3) that the shaping operation is associated with at least one of the one or more additional wireless devices, and the at least one processor is further configured to:
   detect a distribution associated with the at least one shaping operation, wherein to perform the demodulation of the QAM MU-MIMO communication the at least one processor is configured to perform the demodulation based on the distribution associated with the at least one shaping operation, wherein the demodulation is configured to demodulate the QAM MU-MIMO communication based on the distribution associated with the at least one shaping operation; or refrain from detecting the distribution associated with the at least one shaping operation, wherein to perform the demodulation of the QAM MU-MIMO communication, the at least one processor is configured to perform the demodulation that does not consider knowledge of the at least one shaping operation associated with at least one of the at least one layer of the QAM MU-MIMO communication, the majority of layers of the QAM MU-MIMO communication, or the one or more additional wireless devices.

4. The apparatus of claim 3, wherein the at least one shaping operation is at least one constellation shaping operation, and wherein the indication of the at least one shaping operation comprises information regarding at least one modulation and coding scheme (MCS) table associated with the one or more additional wireless devices.

5. The apparatus of claim 4, wherein to detect the distribution, the at least one processor is configured to detect the distribution based on the at least one MCS table.

6. The apparatus of claim 2, wherein the indication indicates at least one of (1) that the at least one layer of the QAM MU-MIMO communication is not associated with the shaping operation, (2) that the majority of layers of the QAM MU-MIMO communication are not associated with the shaping operation, (3) that the shaping operation is not associated with the one or more additional wireless devices, and the at least one processor is further configured to:

detect a modulation order associated with at least one of the at least one layer of the QAM MU-MIMO communication or at least one of the one or more additional wireless devices, wherein to perform the demodulation of the QAM MU-MIMO communication, the at least one processor is configured to perform the demodulation further based on the modulation order.

7. The apparatus of claim 1, wherein the indication of the non-uniform distribution of symbols associated with the at least one shaping operation comprises information regarding at least one of:

a shaping rate;

a shaping parameter;

a power scaling factor associated with the at least one shaping operation; or at least one modulation and coding scheme (MCS) value associated with the at least one shaping operation for the one or more additional wireless devices.

8. The apparatus of claim 1, wherein the at least one processor is further configured to:

receive an additional indication of a scrambling sequence associated with at least one demodulation reference signal (DMRS) associated with the one or more additional wireless devices, wherein to perform the demodulation of the QAM MU-MIMO communication, the at least one processor is configured to perform the demodulation of the QAM MU-MIMO communication based on the at least one DMRS.

9. The apparatus of claim 1, wherein the indication of the at least one shaping operation comprises information regarding one or more of:

whether there are wireless devices that are co-scheduled with the first wireless device;

a number of co-scheduled layers of the QAM MU-MIMO communication;

a number of wireless devices of the one or more additional wireless devices; or a set of time-and-frequency resources associated with co-scheduled QAM MU-MIMO communications with the one or more additional wireless devices.

10. The apparatus of claim 1, wherein the at least one processor is further configured to: receive a second transmission along with the QAM MU-MIMO communication, wherein the second transmission is associated with the one or more additional wireless devices.

11. The apparatus of claim 1, wherein to receive the indication of the at least one shaping operation, the at least one processor is configured to: receive the indication, at least in part, via a second stage DL control information (DCI) of a multi-stage DCI procedure.

12. The apparatus of claim 1, wherein the at least one processor is further configured to:

transmit, for the network node, at least one of a first additional indication that the first wireless device is capable of performing a demodulation based on the indication of the at least one shaping operation or a second additional indication of whether the first wireless device is capable of performing a blind detection of at least one of a modulation and coding scheme (MCS) or a parameter associated with the at least one shaping operation.

13. The apparatus of claim 1, wherein to perform the demodulation of the QAM MU-MIMO communication, the at least one processor is configured to perform a non-linear demodulation of the QAM MU-MIMO communication that estimates an interference associated with the one or more layers of the QAM MU-MIMO communication based on the indication of the non-uniform distribution of the symbols.

14. An apparatus for wireless communication at a network node, comprising:

at least one memory; and at least one processor coupled to the at least one memory and, based at least in part on stored information that is stored in the at least one memory, the at least one processor is configured to:

output, for a first wireless device, an indication of a non-uniform distribution of symbols associated with at least one shaping operation associated with one or more layers of a quadrature amplitude modulated (QAM) multiple user multiple input multiple output (MU-MIMO) communication, wherein the one or more layers of the QAM MU-MIMO communication are associated with one or more additional wireless devices in a plurality of wireless devices, wherein each of the plurality of wireless devices is a co-scheduled wireless device associated with a layer of the QAM MU-MIMO communication, and wherein the first wireless device is included in the plurality of wireless devices;

generate, based on a first shaping operation associated with the first wireless device and the at least one shaping operation, a set of symbols for the QAM MU-MIMO communication; and output, for transmission to the plurality of wireless devices, the QAM MU-MIMO communication.

15. The apparatus of claim 14, wherein the indication of the at least one shaping operation comprises at least one of (1) a first single-bit indication of whether at least one layer of the QAM MU-MIMO communication is associated with a shaping operation, (2) a second single-bit indication indicating whether a majority of layers of the QAM MU-MIMO communication are associated with the shaping operation, or (3) one or more single-bit indications indicating whether the shaping operation is associated with a corresponding additional wireless device of the one or more wireless devices.

16. The apparatus of claim 14, wherein the at least one shaping operation is at least one constellation shaping operation, and wherein the indication of the at least one shaping operation comprises information regarding at least one modulation and coding scheme (MCS) table associated with the one or more additional wireless devices.

17. The apparatus of claim 14, wherein the indication of the non-uniform distribution of symbols associated with the at least one shaping operation comprises information regarding at least one of:

a shaping rate;

a shaping parameter;

a power scaling factor associated with the at least one shaping operation; or at least one modulation and coding scheme (MCS) value associated with the at least one shaping operation for the one or more additional wireless devices.

18. The apparatus of claim 14, wherein the at least one processor is further configured to:

output, for the first wireless device, an additional indication of a scrambling sequence associated with at least one demodulation reference signal (DMRS) associated with the one or more additional wireless devices, wherein the scrambling sequence is associated with a demodulation of the QAM MU-MIMO communication at the first wireless device.

19. The apparatus of claim 14, wherein the indication of the at least one shaping operation comprises information regarding one or more of:

whether there are wireless devices that are co-scheduled with the first wireless device;

a number of co-scheduled layers of the QAM MU-MIMO communication;

a number of wireless devices of the one or more additional wireless devices; or a set of time-and-frequency resources associated with co-scheduled QAM MU-MIMO communications with the one or more additional wireless devices.

20. The apparatus of claim 14, wherein the at least one processor is further configured to: transmit a second transmission along with the QAM MU-MIMO communication, wherein the second transmission is associated with the one or more additional wireless devices, and wherein to output the indication of the at least one shaping operation, the at least one processor is configured to output the indication, at least in part, in association with a second stage DL control information (DCI) of a multi-stage DCI procedure.

21. The apparatus of claim 14, wherein the at least one processor is further configured to:

receive, from the first wireless device, at least one of a first additional indication that the first wireless device is capable of performing a demodulation based on the indication of the at least one shaping operation or a second additional indication of whether the first wireless device is capable of performing a blind detection of at least one of a modulation and coding scheme (MCS) or a parameter associated with the at least one shaping operation.

22. The apparatus of claim 14, wherein the at least one shaping operation is one of a probabilistic amplitude shaping operation or a geometric shaping operation.

23. The apparatus of claim 14, wherein the first shaping operation and each shaping operation of the at least one shaping operation is a same shaping operation.

24. The apparatus of claim 14, wherein the first shaping operation and the at least one shaping operation are different shaping operations.

25. A method of wireless communication at a first wireless device, comprising:

receiving an indication of a non-uniform distribution of symbols associated with at least one shaping operation associated with one or more layers of a quadrature amplitude modulated (QAM) multiple user multiple input multiple output (MU-MIMO) communication, wherein the one or more layers of the QAM MU-MIMO communication are associated with one or more additional wireless devices in a plurality of wireless devices, wherein each of the plurality of wireless devices is a co-scheduled wireless device associated with a layer of the QAM MU-MIMO communication, and wherein the first wireless device is included in the plurality of wireless devices;

receiving, from a network node, the QAM MU-MIMO communication;

performing a demodulation of the QAM MU-MIMO communication based on the indication; and outputting a result of the demodulation of the QAM MU-MIMO communication for at least one of a transmission to at least one other wireless device or a local storage at the first wireless device.

26. The method of claim 25, wherein the at least one shaping operation is one of a probabilistic amplitude shaping operation or a geometric shaping operation, and wherein the indication of the at least one shaping operation comprises at least one of (1) a first single-bit indication of whether at least one layer of the QAM MU-MIMO communication is associated with a shaping operation, (2) a second single-bit indication of whether a majority of layers of the QAM MU-MIMO communication are associated with the shaping operation, or (3) one or more single-bit indications indicating whether the shaping operation is associated with a corresponding additional wireless device of the one or more additional wireless devices.

27. The method of claim 26, wherein the indication indicates at least one of (1) that the at least one layer of the QAM MU-MIMO communication is associated with the shaping operation, (2) that the majority of layers of the QAM MU-MIMO communication are associated with the shaping operation, (3) that the shaping operation is associated with at least one of the one or more additional wireless devices, the method further comprising one of:

detecting a distribution associated with the at least one shaping operation, wherein the demodulation of the QAM MU-MIMO communication is further based on the distribution associated with the at least one shaping operation, wherein the demodulation is configured to demodulate the QAM MU-MIMO communication based on the distribution associated with the at least one shaping operation; or refraining from detecting the distribution associated with the at least one shaping operation, wherein the demodulation of the QAM MU-MIMO communication does not consider knowledge of the at least one shaping operation associated with at least one of the at least one layer of the QAM MU-MIMO communication, the majority of layers of the QAM MU-MIMO communication, or the one or more additional wireless devices.

28. The method of claim 25, wherein the indication of the non-uniform distribution of symbols associated with the at least one shaping operation comprises information regarding at least one of:

a shaping rate;

a shaping parameter;

a power scaling factor associated with the at least one shaping operation;

at least one modulation and coding scheme (MCS) value associated with the at least one shaping operation for the one or more additional wireless devices;

whether there are wireless devices that are co-scheduled with the first wireless device;

a number of co-scheduled layers of the QAM MU-MIMO communication;

a number of wireless devices of the one or more additional wireless devices; or a set of time-and-frequency resources associated with co-scheduled QAM MU-MIMO communications with the one or more additional wireless devices.

29. The method of claim 25, wherein performing the demodulation of the QAM MU-MIMO communication comprises performing a non-linear demodulation of the QAM MU-MIMO communication that estimates an interference associated with the one or more layers of the QAM MU-MIMO communication based on the indication of the non-uniform distribution of the symbols.

30. A method of wireless communication at a network node, comprising:

outputting, for a first wireless device, an indication of a non-uniform distribution of symbols associated with at least one shaping operation associated with one or more layers of a quadrature amplitude modulated (QAM) multiple user multiple input multiple output (MU-MIMO) communication, wherein the one or more layers of the QAM MU-MIMO communication are associated with one or more additional wireless devices in a plurality of wireless devices, wherein each of the plurality of wireless devices is a co-scheduled wireless device associated with a layer of the QAM MU-MIMO communication, and wherein the first wireless device is included in the plurality of wireless devices;

generating, based on a first shaping operation associated with the first wireless device and the at least one shaping operation, a set of symbols for the QAM MU-MIMO communication; and outputting, for transmission to the plurality of wireless devices, the QAM MU-MIMO communication.

* * * * *